US012597024B2

(12) United States Patent
Giroti

(10) Patent No.: US 12,597,024 B2
(45) Date of Patent: Apr. 7, 2026

(54) SYSTEM TO MASSIVELY SCALE THE REDUCTION OF GREENHOUSE GAS EMISSIONS WITH CLIMATE ACTION PLATFORM THAT SOLVES MANY CHALLENGES INCLUDING DOUBLE COUNTING, TRACEABILITY, AND FRICTION

(71) Applicant: Sudhir Kumar Giroti, Pompano Beach, FL (US)

(72) Inventor: Sudhir Kumar Giroti, Pompano Beach, FL (US)

( * ) Notice: Subject to any disclaimer, the term of this patent is extended or adjusted under 35 U.S.C. 154(b) by 52 days.

(21) Appl. No.: 18/357,705

(22) Filed: Jul. 24, 2023

(65) Prior Publication Data

US 2023/0394507 A1     Dec. 7, 2023

Related U.S. Application Data

(60) Provisional application No. 63/345,341, filed on May 24, 2022.

(51) Int. Cl.
G06Q 20/40          (2012.01)
G06Q 10/087         (2023.01)
(Continued)

(52) U.S. Cl.
CPC ..... G06Q 20/38215 (2013.01); G06Q 10/087 (2013.01); G06Q 20/12 (2013.01); G06Q 20/3827 (2013.01); G06Q 20/389 (2013.01); G06Q 20/401 (2013.01); G06Q 20/42 (2013.01); G06Q 30/018 (2013.01); G06Q 30/06 (2013.01); G06Q 30/0637 (2013.01);
(Continued)

(58) Field of Classification Search
CPC ......... G06Q 20/38215; G06Q 20/3827; G06Q 20/3829; G06Q 20/389; G06Q 20/401; G06Q 20/42; G06Q 30/0185; G06Q 30/0637
USPC ........................................................ 705/71
See application file for complete search history.

(56) References Cited

U.S. PATENT DOCUMENTS

| | | | |
|---|---|---|---|
| 2009/0006247 A1* | 1/2009 | Hansen ................. | G06Q 30/02 707/999.107 |
| 2011/0015973 A1* | 1/2011 | Benjamin .......... | G06Q 30/0207 705/14.1 |

(Continued)

*Primary Examiner* — Wodajo Getachew
(74) *Attorney, Agent, or Firm* — Dunlap Bennett & Ludwig PLLC

(57)          ABSTRACT

A method and system for reducing carbon footprint. The process includes the step of receiving a plurality of carbon offset products available for purchase, maintaining an inventory of the plurality of carbon offset products. The process further include the step of displaying the plurality of carbon offset products along with a respective carbon credit value to a user on a mobile device, receiving a request for purchase from the user, verifying the selected at least one carbon offset product provenance by validating the metadata mapped with the at least one carbon offset product in the blockchain ledger, confirming an order of purchase of the selected carbon offset product if the at least one carbon offset product provenance is validated. The process further includes the step of generating a digital certificate based on the confirmed order, the digital certificate comprising the carbon credit value associated with the purchased carbon offset product.

8 Claims, 7 Drawing Sheets

(51) Int. Cl.

| | |
|---|---|
| *G06Q 20/12* | (2012.01) |
| *G06Q 20/38* | (2012.01) |
| *G06Q 20/42* | (2012.01) |
| *G06Q 30/018* | (2023.01) |
| *G06Q 30/06* | (2023.01) |
| *G06Q 30/0601* | (2023.01) |
| *G06Q 20/36* | (2012.01) |

(52) U.S. Cl.
   CPC ......... *G06Q 20/36* (2013.01); *G06Q 20/3829*
                (2013.01); *G06Q 30/0185* (2013.01)

(56)                      References Cited

U.S. PATENT DOCUMENTS

| | | | | |
|---|---|---|---|---|
| 2017/0032475 A1* | 2/2017 | Chawla | .................. | G06Q 20/18 |
| 2020/0142682 A1* | 5/2020 | Marks | ....................... | G06F 8/65 |
| 2023/0177496 A1* | 6/2023 | Le Van Gong | ...... | G06Q 20/065 |
| 2023/0196459 A1* | 6/2023 | Gogerty | .............. | G06Q 30/018 |
| | | | | 705/37 |
| 2024/0193684 A1* | 6/2024 | Bai | ...................... | G06Q 20/123 |

\* cited by examiner

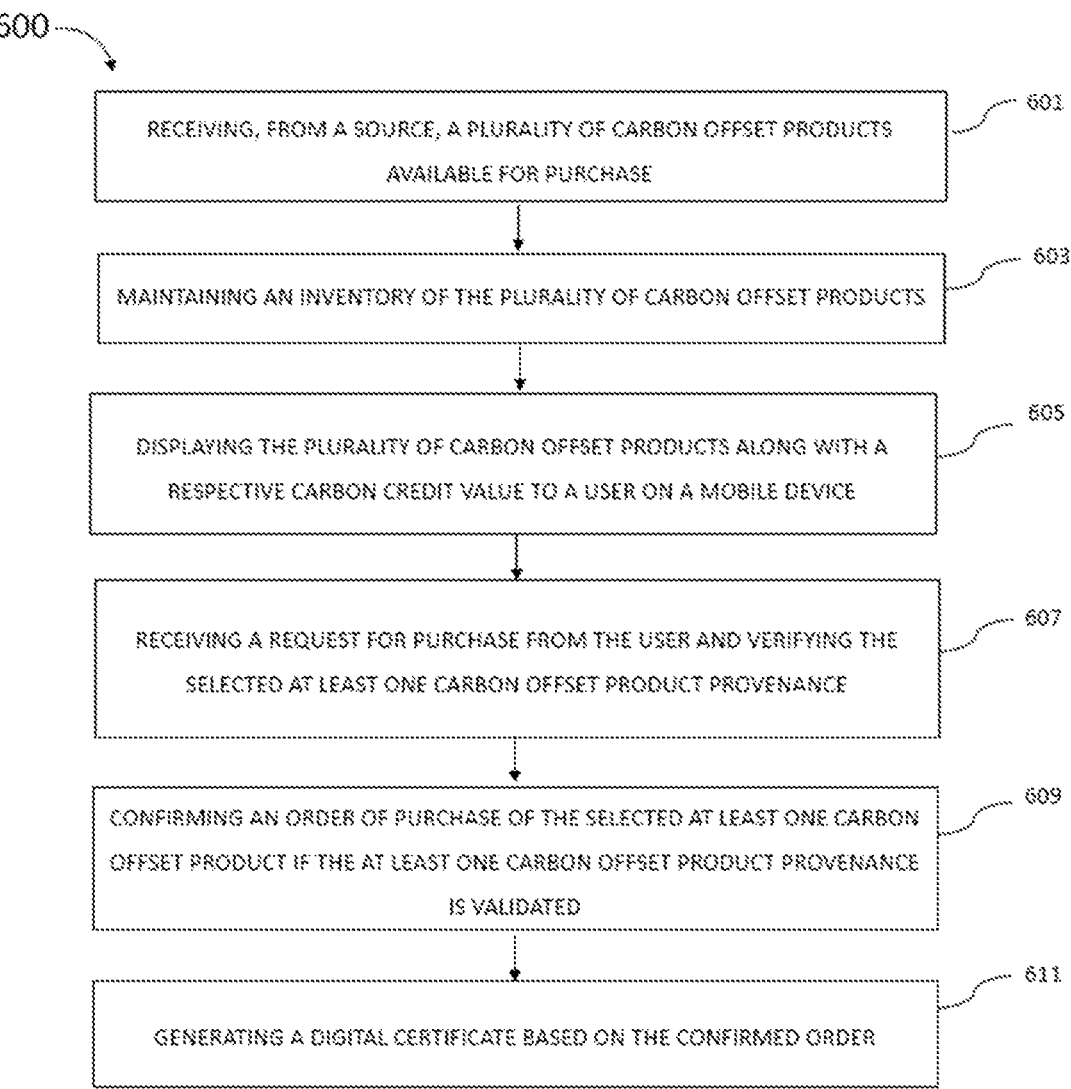

600

RECEIVING, FROM A SOURCE, A PLURALITY OF CARBON OFFSET PRODUCTS AVAILABLE FOR PURCHASE — 601

MAINTAINING AN INVENTORY OF THE PLURALITY OF CARBON OFFSET PRODUCTS — 603

DISPLAYING THE PLURALITY OF CARBON OFFSET PRODUCTS ALONG WITH A RESPECTIVE CARBON CREDIT VALUE TO A USER ON A MOBILE DEVICE — 605

RECEIVING A REQUEST FOR PURCHASE FROM THE USER AND VERIFYING THE SELECTED AT LEAST ONE CARBON OFFSET PRODUCT PROVENANCE — 607

CONFIRMING AN ORDER OF PURCHASE OF THE SELECTED AT LEAST ONE CARBON OFFSET PRODUCT IF THE AT LEAST ONE CARBON OFFSET PRODUCT PROVENANCE IS VALIDATED — 609

GENERATING A DIGITAL CERTIFICATE BASED ON THE CONFIRMED ORDER — 611

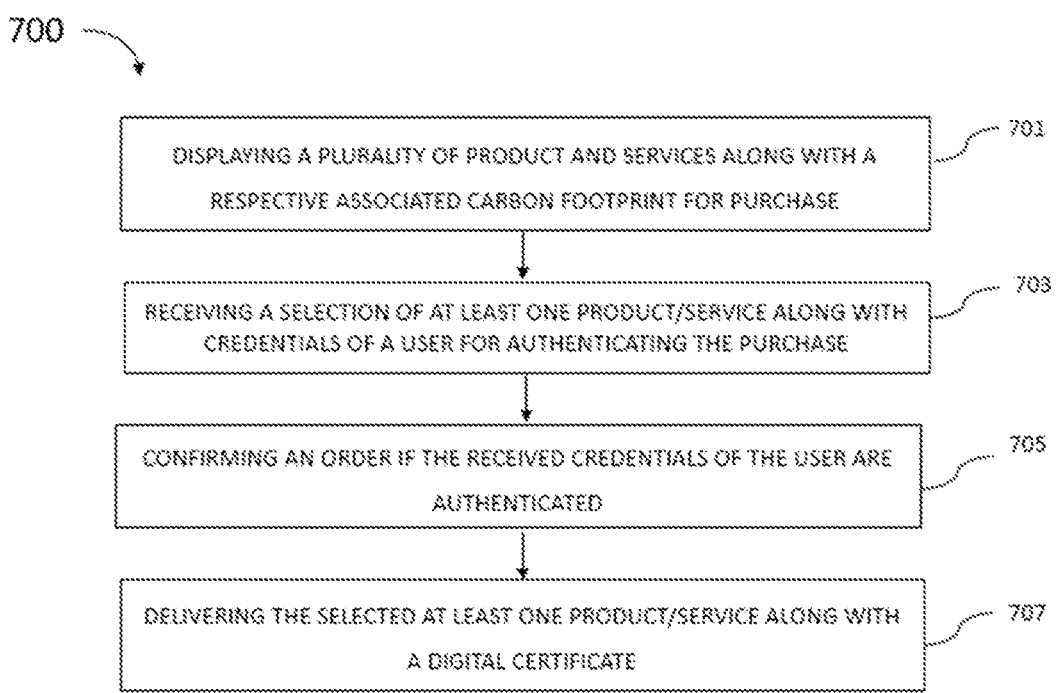

| DISPLAYING A PLURALITY OF PRODUCT AND SERVICES ALONG WITH A RESPECTIVE ASSOCIATED CARBON FOOTPRINT FOR PURCHASE | 701 |

| RECEIVING A SELECTION OF AT LEAST ONE PRODUCT/SERVICE ALONG WITH CREDENTIALS OF A USER FOR AUTHENTICATING THE PURCHASE | 703 |

| CONFIRMING AN ORDER IF THE RECEIVED CREDENTIALS OF THE USER ARE AUTHENTICATED | 705 |

| DELIVERING THE SELECTED AT LEAST ONE PRODUCT/SERVICE ALONG WITH A DIGITAL CERTIFICATE | 707 |

FIG. 7

SYSTEM TO MASSIVELY SCALE THE REDUCTION OF GREENHOUSE GAS EMISSIONS WITH CLIMATE ACTION PLATFORM THAT SOLVES MANY CHALLENGES INCLUDING DOUBLE COUNTING, TRACEABILITY, AND FRICTION

CROSS-REFERENCE TO RELATED APPLICATION

This application claims the benefit of priority of U.S. provisional application No. 63/345,341, filed 24 May 2022, the contents of which are herein incorporated by reference.

BACKGROUND OF THE INVENTION

The present invention relates to a system and method that solves myriad of problems that are impeding the mass adoption of reducing greenhouse gas (GHG) emissions for individuals and businesses. Reducing GHG emissions is critical to solving the global climate crisis and mass and rapid adoption is key to addressing this crisis. More particularly, the present disclosure mainly relates to a system and method that solves the problem of double counting, and lack of supply chain traceability while reducing friction, green-washing and green-hushing in the marketplace related to GHG emission reduction.

Human actions are the main cause of carbon footprint. The carbon footprint is the total amount of greenhouse gases that are generated by natural sources and human activities. Increased greenhouse gas emissions contribute directly to global warming. Greenhouse gases may include water vapor, carbon dioxide ($CO_2$), methane ($CH_4$), nitrous oxide ($N_2O$), and other fluorinated gases. The main sources of greenhouse gas emissions are fossil fuels, deforestation, and the rapid expansion of farming, development, industrial activities, etc. Many business activities, including manufacturing, transportation, construction, traveling and others, also result in the direct and indirect emissions of greenhouse gases.

Although climate crisis impacts everyone, reducing carbon footprint is not a mainstream activity today, as it's a complex process and only large companies with means and tools can achieve that. The average person and a great majority of the small to medium businesses lack the know-how, means and tools to reduce their carbon footprint. Although people (including businesses) have the intent to reduce their carbon footprint, they are not able to act on this intent due to complexity in the carbon reducing process. Challenges include complexity in calculating carbon footprint easily, lack of consumer confidence in the carbon offset market, unfriendly consumer experience and sheer lack of tools. The "intent-action" gap suggests that users (and businesses) want to reduce their carbon footprint, but they do not act on this intent for some reason or another—primarily due to friction in the process. Historically, reducing friction is a game changer and has been proven to improve adoption in other industries including banking, telecom, and online retail business. Reducing friction bridges the great divide between user "intent" and user "action" and sets the foundation for scalability towards mass adoption.

Furthermore, companies are green-washing their commitment by exaggerating their sustainability claims. While on the other hand, due to backlash to green-washing, many companies have resorted to green-hushing and keeping quiet about their sustainability initiatives. These two challenges are also increasing the "intent-action" gap and introduction friction in the marketplace. A standardized and transparency would alleviate the problem of both green-washing and green-hushing.

Individuals and organizations interested in reducing their carbon and GHG emissions have a choice of buying different types of emission reduction instruments such as carbon credits, carbon offsets, emission reduction credits (ERCs), mobile emission reduction credits (MERC), international renewable energy credits (I-RECs or RECs), solar renewable energy credits (SRECs) and energy attribute certificates (EACs) others.

A carbon offset is a reduction or removal of emissions of carbon dioxide or other greenhouse gases made to compensate for emissions made elsewhere. Carbon offsets are usually referred to within the context of a voluntary reduction of one's carbon footprint. A carbon credit on the other hand, is issued by a regulatory organization that limits the owner to emitting only the prescribed amount of carbon emissions while doing their business. A carbon credit that is not utilized is also equivalent to reducing greenhouse gas emissions. The unit of measurement for a carbon offset and a carbon credit is metric or kilo tons of carbon or equivalent (MtCo2e or KtCo2e). A Renewable Energy Certificate (REC) is a market tradeable instruments issued to producers of renewable solar energy. A REC can be bought by individuals and businesses to offset their use of electricity from fossil fuel. These instruments can also be bought by businesses to mitigate their Scope 1, Scope 2 and Scope 3 emissions.

A variety of greenhouse gas reduction and renewable energy projects can be used to create offsets and credits. Certified carbon offsets with their source and verification information are available for purchase on carbon exchanges. Carbon offsets are transferable financial instruments and so can be purchased from a carbon exchange to, in effect, reduce one's carbon footprint. Certified carbon credits and RECs also are sold on exchanges albeit the controls for the credits are stronger than the offsets but by no means fool proof. Herein, reference to carbon offsets, credits, and renewable energy certificates collectively is referred to as offsets or credits.

A summary and use of these instruments is provided as follows:

(a) Greenhouse (GHG) gases: According to United States Environmental Protection Agency (EPA) the "gases that trap heat in the atmosphere are called greenhouse gases". The primary GHGs and their percent composition in the atmosphere are Carbon Dioxide (76%), Methane (16%), Nitrous Oxide (6%), and other trace gases (2%) are HFC, PFC and SF6 (collectively referred to as F-gases). The world produced over 50 billion tons of greenhouse gases in 2020 which is a 40% increase from 1990 levels of 35 billion tons. GHGs are measured in 'carbon dioxide equivalents' (CO2e) because each gas has a different impact on warming and carbon dioxide emission is used as a yardstick. For example, for the same physical amount, methane has 28 times greater potency and impact on warming the climate compared to carbon dioxide. Therefore, one ton of Methane emission produces the equivalent of 28 tons of warming produced by Carbon Dioxide. With all the gases combined, on an average, every person on the planet produces 6.3 metric tons of CO2e (carbon dioxide equivalent) emissions per year. China with 10.67 billion CO2e is the largest (26.1%) producer of greenhouse gases followed by United States with 4.71 CO2e (13.4%). As continents, Asia produces 53%, followed by North America with 18% and then followed by European Union with 17% of global emissions. The present embodiment uses carbon dioxide equivalent for calculation.

(b) Carbon Credits: The government controls how much carbon dioxide equivalent can be emitted by businesses. The businesses receive a permit for carbon credits from the government that allows them to emit less than the suggested number of emissions. The government regulates the distribution of these credits through a cap-and-trade program where certain permits are available to be used, while any surplus credits can be sold to willing buyers. The government periodically reduces the volume of these permits to encourage businesses to reduce their emission and businesses comply by deploying new technologies and other techniques. It is common for one business with surplus carbon credits to sell its surplus to a company needing credits for business expansion or other purposes. The present embodiment allows these credits to be bought and sold in the aftermarket with traceability. The present embodiment will also be used by the government to facilitate creation of new cap and trade markets based upon trust, traceability, and elimination of double counting.

(c) Carbon Offsets: Individuals and organizations committed to reducing their greenhouse gas emissions can purchase carbon offsets from project developers or intermediaries to further reduce their greenhouse gas emissions. Each carbon offset represents one metric ton of carbon removed from the atmosphere. Although carbon offsets are offered on the voluntary market, there are some regulations that standardize the generation and verification of such offsets. Even with best intentions, individuals and companies are limited to reducing their emission footprint because every product including food, travel, clothing, building, housing, and general living results in the generation of greenhouse gases and companies and individuals can only do so much in reducing their emissions. Carbon offsets are therefore considered an easy instrument to reduce greenhouse gas emissions. The present embodiment uniquely identifies each carbon offset, as none is identified prior to this embodiment, with a unique digital identifier, which is then used to monitor and trace the lifecycle of each carbon offset.

(d) Renewable Energy Certificate (REC), International Renewable Energy Certificates (I-RECs) and Solar renewable energy certificates (SRECs): Every business needs electricity to run their business, and this electricity supplied by the local utility may have been generated from the use of fossil-fuel like coal, which results in the emission of greenhouse gases. A company's greenhouse gas emissions from the use of electricity are categorized under the so-called "Scope 2" emissions. Companies interested in reducing their Scope 2 greenhouse gas emissions that come from the use of fossil-fuel based electricity, can replace this electricity with renewable energy either directly by installing of renewable energy sources like rooftop solar or indirectly by buying RECs, IRECs and SRECs as these are legal instruments used in renewable energy electricity markets, to enable buyers to account for the use of renewable electricity even when purchased from elsewhere. Each REC/SREC provides the right to a buyer that one REC or SREC is equivalent to one megawatt-hour of electricity consumed by the buyer from renewable energy.

(e) Emission Reduction Credits (ERC) and Mobile Emission Reduction Credits (ERCs): Each company gets a license to emit a certain amount of greenhouse emissions. A carbon credit is a type of ERC that allows the company to emit carbon or greenhouse gas in the atmosphere. A company can increase its emissions in one part of the business if they reduce their emission in another part of the business. For example, if a business expands by constructing a new office building, they may shut down another part of their business, for example, a manufacturing plant. An even swap of emissions is acceptable as the business does not require new ERCs. However, any addition to emission will require the business to procure more ERCs, whereas any reduction in emissions may result in surplus emission credits that the company can sell to other buyers. These emissions can be bought and sold.

In the existing art, the generation, selling and buying of the carbon offsets and credits is highly fragmented. The cradle-to-grave lifecycle for offsets and credits does not exist. For credits, a cap-and-trade system governed by state and federal governments exists in China, Europe, and parts of United States that certifies and list credits, but downstream gaps in selling and disposition, can negate upstream standards and controls. For offsets, non-governmental voluntary and fragmented marketplace exists with independent certifiers such as Gold Standard, Veera, American Carbon Registry, and independent verifiers and monitors. Apart from a mandatory requirement to register the offsets, the purchase or disposition of these offsets is neither tracked nor controlled. Consequently, due to lack of transparency between offset being available for sale to retirement, a seller can knowingly or unknowingly sell the same carbon offset to more than one buyer and/or wittingly or unwittingly choose to not record its retirement or disposition. Consequently, an emission or carbon offset can be bought or sold more than once specifically on the retail market which lacks any controls. Due to lack of unique identification of each instrument (unlike a bank note) the risk of double continues persists to the present day. This risk keeps the buyers concerned about the market and a cause for major friction in the marketplace.

Double counting means counting of the value of the carbon offset more than once. Currently, carbon offsets cannot be independently identified (like bank notes) and the selling process lacks controls for accountability and traceability. This means that the same carbon offset can be sold repeatedly to unsuspecting buyers. The certification, verification and monitoring process also referred to as "certification standard", "verification standard" and "monitoring standard" validates that a project P has the capacity to sequester or mitigate x units of carbon or GHG emissions and therefore x units of carbon or emission offsets can be sold to any willing buyers. When the carbon offset is listed on an exchange, these standards and certifications require the offset to be retired upon sale and disposition. But there is no validation or monitoring on the selling side of the x units. A legitimate buyer can purchase y out of x units of such offsets and retire them to claim credit for mitigating their GHG or carbon footprint by y units. However, with double counting, a seller can sell the same y units of the certified and verified x offsets, repeatedly, to multiple buyers.

The carbon offsets are offered on voluntary markets for purchase. Companies and independent intermediaries can buy these offsets and either retire them or sell them downstream to other buyers. Although it is expected that each carbon offset is retired with the name of the buyer, there is no regulatory structure or accountability that protects against intentional or unintentional selling of the same offset repeatedly. However, retail buyers do not get any guarantee whether their purchased offset is being offered uniquely to them or it has been double sold by the intermediary.

Gold Standard, Veera, American Carbon Registry, and others identified as "standards" can be regulated and verified by governmental bodies while emission offsets can be verified by standard organizations can be buy and sell these instruments for neutralizing or reducing carbon footprint, and more specifically to a system and method for assisting individuals and small and midsize enterprises (SMEs) to efficiently and effectively neutralize or reduce the carbon footprint due to human activities. A REC can be purchased by any company to reduce their Scope 2 emissions. Scope 2 emissions are referred to a company's greenhouse emissions related to their purchase of electricity from their utility. By purchasing RECs, companies can offset their usage of electricity which may be generated from fossil fuels.

Although most credits are regulated, and most offsets are unregulated or rather not fully regulated, the upstream lifecycle of both the offsets and credits is standardized whereas the downstream lifecycle is not very well standardized. For example, the upstream due diligence required to certify the birth of a credit, or an offset is standardized and verifiable by certifying companies or government entities, but the downstream controls over trading and selling, are fraught with double counting as the seller can sell or trade the instrument multiple times knowingly or unknowingly. Unsuspecting buyers may not have the means to easily verify the authenticity of their purchases despite the mandates to retire the offsets upon their use. Such lack of controls on the selling-side and lack of supply chain traceability makes the prospects of double counting plausible. The problem of double counting is more acute in the offset versus the credits market and problems of traceability are universal for all offsets and credits. The present embodiment solves the problems related to double counting and supply chain traceability.

In short, the purchase and sale of carbon offsets and other digital sustainability products or services are fraught with unreliable market and duplicate counting. Further, the present vendors are offering no means to ensure that each carbon offset or digital sustainability product is never bought or sold more than once. This reduces consumer confidence and makes the market for such products and services unreliable.

Furthermore, these offsets and credits are not easily accessible or readily available for purchase for the public and businesses. Although large companies can engage intermediaries to access the market to become sustainable, the market is largely unreachable by individuals and small to medium businesses, who may be able and willing buyers but are unable to access the market due to friction in the marketplace. Apart from exceptional scenarios, these instruments are largely inaccessible to the public and small to medium businesses. Even when accessible to the motivated, a carbon offset purchased does not result in any tangible product to be shipped to the customer as the product is purely digital. Furthermore, the selling vendor does not provide any assurance of its authenticity, its uniqueness, or its traceability. As the buyer never "sees" the product the seller is creating baseless "certificate" which are merely purchase orders packaged as "certificates" without any warranty, representations, or traceability to the actual offset.

Without controls the product can be sold repeatedly to multiple buyers resulting in double counting.

Specifically, the following problems persist with most of the offset and credit exchanges and specifically with the voluntary carbon offsets exchanges: (1) even certified and verified carbon offsets lack transparency and end-to-end traceability from source to disposition and as a result, carbon offsets can be sold multiple times diminishing its benefits and reducing confidence in the market; (2) the purchasing process is fraught with friction making it difficult for individuals and small to medium businesses to reduce their carbon footprint; and (3) consumer friendly tools such as simple calculators are not common place and those that exist are difficult to navigate. Lack of confidence, complexity and friction dissuades individuals and businesses from not being able to reduce their carbon footprint.

The first problem is that current exchanges or networks cannot track if a carbon offset was sold twice or thrice to end customers because once a buyer buys an offset or credit from the exchange then unsuspected buyers can be sold the same product multiple times. This problem of double counting of carbon offsets erodes trust in the marketplace and dissuades users from relying on this powerful approach to reducing one's carbon footprint. In other words, current carbon exchanges or network do not provide traceability from source to disposition, and thus do not manage the tracing of sale and disposition of carbon offsets.

The second problem is that it is not easy for an average buyer (regular people and small to medium businesses) to purchase these carbon offsets from of the carbon exchanges because the process is fraught with red tape: filling forms and waiting for days and weeks. The average buyer does not have the time, resources, or patience to take this critical step in becoming carbon neutral. In other words, the process of buying certified carbon offsets has a lot of friction. The current system is mostly manual and based on paper or electronic documents with low confidence. There is a big gap between their intent to reduce their carbon footprint and doing something to reduce their carbon footprint. This intent-to-action gap is also referred to as friction. There are standards in place but those are only applicable in certifying carbon offsets. In sum, current carbon offset exchanges do not work well because there is no traceability and most of the steps are manual and are not simplified.

The third problem is that consumers and businesses resort to spreadsheets, manual processes or long complex forms to calculate their carbon footprint which makes it not only difficult but error prone. User experience is inconsistent, unreliable and untrustworthy. Furthermore sellers of carbon offsets do not provide hard evidence of the uniqueness of their products, beyond referring to their offsets and credits as certified. During the sale process, made-up certificates without any traceability to back up their claims often fool unsuspected buyers who are unaware that even certified offsets can be sold multiple times by unscrupulous sellers. Buyers have little means to verify the authenticity of these offsets and credits, making the market unreliable and untrustworthy. Furthermore, the current carbon emission calculators are complex with dozens and often hundreds of fields to fill which itself acts as a deterrent for users. Moreover, they are localized to small geographies, are difficult to navigate and lack good user experience. Lack of confidence, complexity, difficulty and friction dissuades potential buyers from taking the first step in reducing their carbon footprint.

The fourth problem is that without transparency and traceability in the system claims by companies towards sustainability and NetZero remain unsubstantiated. A company may exaggerate its commitment to sustainability by green-washing its efforts and when faced with consumer backlash may resort to green-hushing by going the opposite direction and stay shy of communicating their sustainability goals or intentions. Both green-washing and green-hushing are a consequence of lack of trust and confidence in the emission reduction process and lead to increasing the intent-action gap.

As can be seen, there is a need for a method of solving the double counting, supply chain traceability, confidence, and friction problems in reducing greenhouse gas emissions and the carbon footprint due to human activities.

SUMMARY OF THE INVENTION

The present invention is termed as the Climate Action Platform (CAP) that reduces the "intent-action" gap—i.e., the intent to reducing one's carbon footprint and the action needed with tools to fulfilling one's intent. It provides a simplified user experience and technology that enables individuals and businesses to reduce their carbon footprint with frictionless experience. CAP digitizes the end-to-end life-cycle of carbon offsets, carbon credits, mobile credits, renewable energy credits and related products (together referred to as offsets or credits). It combines AI-driven and user-friendly global emission calculators and a simplified end-to-end automated purchasing and fulfilment process. Together the system enables individuals and businesses to reduce their greenhouse gas emissions and become sustainable with a frictionless experience. CAP is a mass market product that can be used by anyone with a browser or a smart phone to reduce their greenhouse gas footprint and mitigate the climate crisis.

In one non-limiting embodiment of the present disclosure, a system is disclosed. The system comprises a memory for storing a plurality of instructions, and a processing unit in communication with the memory capable of executing the plurality of instructions. The system further comprises a transceiver in communication with the memory and the processing unit, and the transceiver is configured to receive a plurality of carbon offset and carbon credit (referred to as offset or credit or offset/credit) products available for purchase. The processing unit is configured to maintain an inventory of the plurality of carbon offset or carbon credit products. Each carbon offset and credit are given a unique id which is used for inventory management, accounting and traceability. Each of the plurality of carbon offset/credit products being stored along with a respective metadata in a blockchain ledger, and each metadata being encrypted using at least one hash function and mapped to the corresponding carbon offset product. The processing unit is configured to display, via a user interface, the plurality of carbon offset/credit products along with a respective carbon offset or carbon credit value to a user on a mobile device, receive, via the user interface, a request for purchase from the user, wherein the request comprises at least one carbon offset/credit product selected by the user and user credentials for authenticating the purchase, verify the selected at least one carbon offset product provenance by validation of the metadata mapped with the at least one carbon offset product in the blockchain ledger, confirm an order of purchase of the selected at least one carbon offset product if the at least one carbon offset product provenance is validated. To confirm the order, the processing unit is configured to generate a unique identifier tag based on the user credentials and hash algorithm, encrypt the unique identifier tag using the at least one hash function to generate a blockchain block, and update the blockchain ledger by adding the blockchain block to the selected at least one carbon offset/credit product. The processing unit is configured to generate a digital certificate based on the confirmed order, wherein the digital certificate comprises the carbon credit value associated with the purchased at least one carbon offset/credit product. Each digital certificate, also referred to as a sustainability certificate, is stamped with a unique hash function, a digital identifier along with its date of generation that in totality verifies its authenticity. Any tampering or modification to the certificate renders it useless and unreliable as the hash function will change from its original hash. A digital certificate includes evidence of carbon traceability with a Carbon chain of custody certificate and an accompanying Carbon authentication guarantee certificate that proves the authenticity of the digital certificate.

In another non-limiting embodiment of the present disclosure, wherein the blockchain ledger is maintained at a server and shared with a plurality of users over the blockchain network.

In another non-limiting embodiment of the present disclosure, wherein the user credentials comprise a user identifier, a password, and optionally bank account details or crypto wallet for executing a transaction.

In yet another non-limiting embodiment of the present disclosure, to authenticate the purchase, the processing unit is configured to compare the user identifier and the password with the plurality of users details present in the database and process the order of purchase if the user identifier and the password match with at least one user of the plurality of users.

In yet another non-limiting embodiment of the present disclosure, wherein the metadata comprises one or more of product identification details, a carbon offset/credit value, and supplier details, and wherein the product identification details comprise type of carbon offset product, location or place of origin and a number of available units.

In yet another non-limiting embodiment of the present disclosure, to update the blockchain ledger, the processing unit is configured to update the number of available units of the selected at least one carbon offset product remaining after executing a transaction of the selected at least one carbon offset product.

In yet another non-limiting embodiment of the present disclosure, the processing unit is configured to maintain a count of carbon offsets/credits associated with the purchased carbon offset product for the user.

In yet another non-limiting embodiment of the present disclosure, to verify the selected at least one carbon offset/credit product provenance, the processing unit is configured to extract the metadata mapped with the selected at least one carbon offset/credit product, determine whether the selected at least one carbon offset/credit product was previously tagged with a unique identifier of another user, and validate the selected at least one carbon offset product provenance if the selected at least one carbon offset product was not previously tagged with a unique identifier of another user.

In yet another non-limiting embodiment of the present disclosure, a system is disclosed. The system comprises a memory for storing a plurality of instructions, a processing unit in communication with the memory capable of executing the plurality of instructions. The processing unit is configured to display, via a user interface, a plurality of product and services along with a respective associated carbon footprint for purchase, receive a selection of at least one product/service along with credentials of a user for authenticating the purchase, confirm an order if the received credentials of the user are authenticated, and deliver the selected at least one product/service along with a digital certificate, the digital certificate comprising a value of carbon footprint mapped with the delivered at least one product/service.

In yet another non-limiting embodiment of the present disclosure, a method is disclosed. The method comprises receiving, from a source, a plurality of carbon offset products available for purchase, maintaining an inventory of the plurality of carbon offset products. Each of the plurality of carbon offset products being stored along with a respective metadata in a blockchain ledger, and each metadata being encrypted using at least one hash function and mapped to the corresponding carbon offset product. The method further comprises displaying the plurality of carbon offset products along with a respective carbon credit value to a user on a mobile device, receiving a request for purchase from the user, wherein the request comprises at least one carbon offset product selected by the user and user credentials for authenticating the purchase, verifying the selected at least one carbon offset product provenance by validating the metadata mapped with the at least one carbon offset product in the blockchain ledger, confirming an order of purchase of the selected at least one carbon offset product if the at least one carbon offset product provenance is validated. The confirming the order comprises generating a unique identifier tag based on the user credentials, encrypting the unique identifier tag using the at least one hash function to generate a blockchain block, and updating the blockchain ledger by adding the blockchain block to the selected at least one carbon offset product, and generating a digital certificate based on the confirmed order, the digital certificate comprising the carbon credit value associated with the purchased at least one carbon offset product.

In yet another non-limiting embodiment of the present disclosure, wherein authenticating the purchase comprises comparing the user identifier and the password among the plurality of user details present in the database and processing the order of purchase if the user identifier and the password matches with at least one user of the plurality of users.

In yet another non-limiting embodiment of the present disclosure, wherein updating the blockchain ledger comprises updating the number of available units of the selected at least one carbon offset product remaining after executing a transaction of the selected at least one carbon offset product.

In yet another non-limiting embodiment of the present disclosure, the method comprises transmitting the generated digital certificate to the user after the transaction associated with the purchase of the selected at least one carbon offset product is completed. This digital certificate (also referred to as sustainability certificate described earlier) is automatically listed as a hyperlink on a dynamic HTML page which itself is generated or modified by the CAP system after the user's purchase is complete, Each dynamic HTML page also referred to as an Eco-Stance or EcoStance page can be accessed like a standard HTML page hosted on the CAP web site (https://www.ecostance.com/<name>.html).

In yet another non-limiting embodiment of the present disclosure, the dynamic HTML sustainability page or the EcoStance page can be formatted with a few options to support regional or global disclosure standards such as International Accounting Standards Board, SEC for Climate disclosures, GHG Protocol focus on Scope 1 and 2, Task Force on Climate-Related Financial Disclosures (TCFD), Science Based Targets Initiatives (SBTi), RE100, ISSB/IFRS Sustainability Disclosure Standards (SDS) and others.

In yet another non-limiting embodiment, businesses can choose to publish their EcoStance page on their website, or in their annual reports or integrated via other means to meet their mandatory ESG or sustainability reporting requirements.

In yet another non-limiting embodiment, businesses can choose to publish their EcoStance page to report their goals, targets and pathways to becoming NetZero. Each snapshot of the EcoStance page is registered in the CAP blockchain to ensure that the content has provenance, and the data is untampered. The pathways and progress can be securely registered and shared with third party organizations such as Science Based Target Initiatives (SBTi).

In yet another non-limiting embodiment of the present disclosure, businesses can choose to publish their EcoStance page to bring transparency and confidence in the marketplace and avoid the problem of green-washing and green-hushing.

In yet another non-limiting embodiment of the present disclosure, the method comprises maintaining a count of the unique id of each carbon offsets/credits associated with the purchased carbon offsets/credits products for the user.

In yet another non-limiting embodiment of the present disclosure, verifying the selected at least one carbon offset product provenance comprises extracting the metadata mapped with the selected at least one carbon offset product, determining whether the selected at least one carbon offset product was previously tagged with a unique identifier of another user, and validating the selected at least one carbon offset product provenance if the selected at least one carbon offset product was not previously tagged with a unique identifier of another user.

In yet another non-limiting embodiment of the present disclosure, a method is disclosed. The method comprises displaying a plurality of product and services along with a respective associated carbon footprint for purchase, receiving a selection of at least one product/service along with credentials of a user for authenticating the purchase, confirming an order if the received credentials of the user are authenticated, and delivering the selected at least one product/service along with a digital certificate, the digital certificate comprising a value of carbon footprint mapped with the delivered at least one product/service.

In yet another non-limiting embodiment of the present disclosure, the method further comprises calculating a total value of carbon footprint based on the purchased product and services for the user and maintaining a record of the total carbon footprint value consumed by the user at a server.

In yet another non-limiting embodiment of the present disclosure, a method and system for reducing carbon footprint with a climate action platform (CAP) for individuals and businesses that accelerates the mitigation of global climate crisis. The CAP solves myriad of challenges, including market friction and low user confidence, with the goal of massively scaling the adoption of carbon reduction by individuals and businesses. The process includes the step of receiving a plurality of carbon and related offset and credit products available for purchase, maintaining an inventory of the plurality of carbon offset products. The process further includes the step of displaying the plurality of carbon offset products along with a respective carbon credit value to a user on a mobile device, receiving a request for purchase from the user, verifying the selected at least one carbon offset product provenance by validating the metadata mapped with at least one carbon offset product in the blockchain ledger, confirming an order of purchase of the selected carbon offset product if at least one carbon offset product provenance is validated. The process improves the user experience and confidence in a variety of ways including: elimination of carbon double counting, real time evidence of carbon traceability reducing user input with AI-enabled calculators, end-to-end automation from order to fulfilment, and API integration at the point of sale. For user confidence, it further includes the step of generating a digital sustainability certificate (SC) that includes carbon traceability with carbon chain of custody certificate (C3 Certificate) and a guarantee of authenticity certificate (CGAC) that proves the authenticity of the SC and C3 Certificate. To bolster mass adoption, a dynamic HTML sustainability or eco stance page is auto created and subsequently updated based upon the confirmed order. The EcoStance page includes digital certificates on a timeline and can be published on social media, resume or company web site with the owner having the flexibility to edit the narrative. The EcoStance page may also serve as a formal sustainability disclosure report for corporations with some additional selections. The standardized EcoStance page will also bring transparency and confidence in the marketplace and reduce the problem of green-washing and green-hushing. The digital sustainability certificate comprises of the carbon credit value associated with the purchased carbon offset product. The sustainability or eco stance page, can be configured to support industry standards designed for sustainability disclosures, and can also serve optionally as a user or company's stance on sustainability and NetZero disclosures. The purchase process can also be initiated via an API call to the CAP system by other pre-authorized machines and applications. By solving myriad of challenges related to confidence and market friction, the CAP platform proposes to foster rapid adoption by empowering everyone to participate in solving the global climate crisis, in earnest.

In a non-limiting embodiment, a system embodied by the present disclosure enables the following:

(1) First elimination of the double counting with digital twin and supply chain traceability solution provided through a traceability module in the following two ways:

(1a) Carbon Chain of Custody Certificate (C3 Certificate)

Utilization of smart contracts to enable Blockchain based traceability of each carbon offset with provenance. A Carbon Chain of Custody Certificate (C3 Certificate) is provided at purchase to enable carbon offset traceability from the source to disposition. For example, a carbon offset generated from a source (say amazon rain forest) could be purchased by an individual or business to reduce their carbon footprint. By uniquely identifying each carbon offset with a digital identifier (digital twin), and then tracking it from source to disposition, the present invention can guarantee that each carbon offset is sold once and only once. A carbon offset after sale is tagged as being retired (as its disposition) thereby ending its useful purpose—as required by law, to eliminate reusability. A retired carbon offset asset cannot be resold thereby eliminating the double counting problem in the industry. This is akin to tracking a package from source to destination in the package delivery industry. To achieve this, the present invention offers the following artifacts to bolster the authenticity of C3 Certificate for customer who has purchased carbon offsets:

(1b) Carbon Guarantee of Authenticity of the Certificate (CGAC)

The Carbon Guarantee of Authenticity Certificate (CGAC) guarantees via metadata that the C3 Certificate is authentic based upon a hash algorithm that is stored in the blockchain. The Ecommerce site uses an API on the blockchain to register the C3 Certificate. The blockchain creates a hash of the C3 Certificate upon document creation. When the C3 certificate is accessed an API on the blockchain is invoked that runs the smart contract that compares the original hash with the hash of the C3 Certificate being accessed. If the two hashes are the same, then the document is deemed authentic and the metadata along with hashes is created in real time and packaged as the CGAC certificate.

(2) Second, the present invention reduces the friction in the marketplace by simplifying the experience of the end users who want to reduce their carbon footprint. This experience is simplified by five different, but related strategies as shown below.

(2a) E-commerce Platform facilities purchase of carbon offsets, credits and other products in a manner familiar to today's online eCommerce stores to eliminate user training and to simplify the user experience but behind the scene it executes transactions in real time with the blockchain to ensure that technical controls and smart contracts are executed in real time using hash functions to ensure that double counting is eliminated and traceability of each product being purchased is recorded. From a user perspective, the user calculates their (individual, family or business) carbon footprint with intelligent AI-driven calculators, selects how much of the carbon footprint they want to reduce with a visually interactive intelligent widget that does not require filling of any form or field, and then optionally chooses either the system selected default product or one or more amongst the inventory of available products. At checkout, the user is provided a familiar checkout experience with the option to enter discount coupons and address. The E-store supports multiple currencies but defaults to the user's home currency based upon the user's location. The user can buy the offsets and credits in their default currency or any currency of their choice in real time during the checkout process. Behind the scenes, the complete transaction from initiation to fulfilment is consummated in seconds or minutes along with all the technical controls that eliminate double counting and provide traceability. The user is instantly provided a Sustainability certificate (SC) that includes an embedded Carbon Chain of Custody Certificate (C3 Certificate), along with a Carbon Guarantee of Authenticity Certificate (CGAC), and a new or updated EcoStance or Sustainability Page or report or dashboard that is accessible as a dynamic HTML page. Such a page can then be posted on various social media sites with native integration with third party social media sites. From a user experience perspective, the transaction takes seconds or minutes from beginning to end resulting in a purchase order, various certificates (SC certificate, C3 certificate and CGAC), a dynamic EcoStance HTML Sustainability page that includes product certificates each with a unique identifier and an informative email that summarizes the transaction with included artifacts generated.

(2b) API at Point of Sale can be embedded by businesses to allow their end customers to make a choice or not if they want to reduce their carbon footprint. In addition to the E-Commerce site suggested above, many online and traditional retailers interested in offering carbon neutral purchases to their customers can embed an API (Application Programming Interface) link on their point of sale (POS) or financial back-office systems to offer a carbon neutral choice to their customers during the checkout process. To set up this offering, as a onetime process, the merchant can select to generate security keys and APIs from the CAP portal through a secure login. The CAP system generates a 256 bit hash of a public private key and an API link defined as a REST or SOAP or other native configurable API link (for example https://www.ecostance.com/apii<key1><key2>) which can then be embedded within any online or offline POS or Financial system. During the purchase process, an end customer sees a carbon neutral line item in human readable form that asks the user if they want to make their purchase carbon neutral. A merchant can modify the language of the carbon neutral line item. In one embodiment the merchant may give their end customers a choice while in another embodiment the end customer is not given this choice and the transaction is made to be carbon neutral by default. As an example, the carbon neutral line item can be: "Make my transaction carbon neutral" if a user is being given a choice, while in another instance the carbon neutral line item can be "This transaction is carbon neutral" if the user is merely being informed. In either way, upon completing the transaction, behind the scene, the server machine hosting the merchant's POS or Financial system and the API sends a request to the CAP server, which then dis-integrates the API's source, merchant, purchase type, purchase sub-type, purchase category, purchase sub-category, amount, currency, customer id, correlation id and a transaction id and registers the API transaction partly on the blockchain and partly on the off chain. The API transaction is then used to buy carbon offsets to neutralize the purchase and the resulting dynamic HTML EcoStance page and certificates, (namely SC, C3, CGAC) are generated and sent via email to the end customer. The full transaction is recorded in the database and a signature of the transaction is registered and recorded on the blockchain. Additionally, this and other similar transactions are sent to the merchant for their records electronically either as a cumulative file or via machine-to-machine transfer in real time via direct integration with the merchant's ERP or Accounting system.

(3) Third, the present invention enables individuals and businesses to create and publish their stance on sustainability with a dynamic HTML "EcoStance" profile page or a dashboard. Every time a purchase is made, a sustainability certificate is generated for each purchase, and the dynamic HTML EcoStance file is created or updated that includes one or more such certificates. If the EcoStance page does not exist, it is created and if it exists it is updated. EcoStance Profile Page allows each individual and business to automatically publish their stance or position of ecofriendly practices and sustainability. The software provides a ready-made page, that can be easily customized from the CAP portal that provides edit options. The system creates a unique URL and a QR code that can be embedded in one's resume, or a company's website and made accessible to users via one-click. This page is editable and can be configured with narrative and contact information. Over time, many individuals, households, and companies may have an EcoStance page or a report with one or more PDF sustainability certificates, combined with a summary of all their purchases and status of their sustainability pathways and goals.

For businesses, the EcoStance page becomes their disclosure report that publishes their position on NetZero pathways and goals, and their Environment, Social and Governance (ESG) practices and metrics. The EcoStance page is refreshed with new certificates as the individual and company buys more offsets and credits. Companies may use the EcoStance page as their formal sustainability disclosure page after applying with some additional selections from the CAP customer portal.

The EcoStance page supports disclosure frameworks and standards including International Accounting Standards Board, SEC for Climate disclosures, GHG Protocol focus on Scope 1 and 2, TCFD/Task Force on Climate-Related Financial Disclosures, Science Based Targets Initiatives (SBTi), RE100, ISSB/IFRS Sustainability Disclosure Standards (SDS) and others.

(4) Fourth, the present invention includes AI-driven intelligent calculators that make it easy to calculate the carbon footprint of people, business, products, building, transportation, supply chain and a service. The calculators allow calculation of carbon footprint of.

Most of the carbon emission calculators in the market today are extremely complex and difficult to use. AI is a proven tool to reduce complexity. In the current embodiment, AI is integrated with the emission calculators to reduce the number of questions that are asked, which reduces the time it takes to enter information. For instance, to calculate the carbon footprint of an individual, a typical calculator may ask 25 to 50 questions whereas the AI-driven calculators in this embodiment ask six questions. As described below the intelligent calculators support all countries in the world and available via a simple user interface that reduces complexity for users. The AI-driven emission calculators include six algorithmic models and components that function as follows: (i) "Emission Reference Model": Carbon emission data of an individual by country is combined with detailed carbon emission calculations for each country to establish a baseline for each country as a reference point. This is called "Emission reference model". This reference model is randomly broken down into two data sets—a training data set and a testing data set. (ii) "Key Predictor Variables": We define a few predictor variables that are specific to a calculation. For example, for an individual or family emission calculator we used income, location, number of members in a household, number of members taking public transportation, house size and offer these as questions for user input in the calculator. Each of these variables may correspond to a "weight" that is a measure of its importance in predicting the outcome. For example, a particular predictor variable (such as house size of an individual) may have more weight compared to another variable (such as type of food consumed by the individual). These weights are determined during run time and become the core bearer of "intelligence" in the algorithms (iii) "AI Algorithm": A carbon calculating algorithm to calculate the carbon footprint of an individual or family is developed that is based upon user input and weighted key predictable variables. For example, the weighted value of user input can be calculated as follows: With three key predictable variables, namely A, B and C each with a weight of a, b and c respectively and the user input value of P, Q and R respectively, for a country whose carbon footprint for an individual is F metric tons of carbon emissions per user, the total algorithmic value of the user input is $((A \times a \times P)+(B \times b \times Q)+(C \times c \times R)) X F$, This is the input to the AI algorithm to calculate the carbon footprint of an individual. (iv) "AI Optimization": The AI algorithm is then run against the training data and compared to the test data to define the baseline. Based upon the variance, it re-calibrates the predictor variables to achieve the outcome that matches the real carbon footprint values within plus/minus 5% variance or accuracy. For example, if eating habits, salary, house size are predictor variables, then it may be determined that a person's house is a better predictor of the outcome versus their eating habits in which case it is assigned a higher weight than the eating habits. This is referred to as AI optimization.

(v) "Predictive AI model": The AI algorithm creates a "Predictive AI model" for each calculator type. In this case If the calculations were for an individual and/or a family the "Individual Predictive AI model" is created taking into account the AI Optimization strategy for individuals and families. (vi) "AI Execution": The Predictive AI model is executed against real time data from user, and the "AI Optimization" model is updated every time the AI Execution engine is run to recalibrate results and the new data becomes part of test data with outcome. Over time, the AI Execution engine self-correct itself by recalibrating its "Predictive AI Model" through "Ai Optimization". As data accrues in real time, the "Predictive AI Model" and "AI algorithm" becomes "intelligent" and the variance reduces from plus/minus 5% to near 0%. The self-correction also enables the number of "Key predictor variables" to reduce over time, which results in lesser number of questions to be asked from the user in calculating their carbon footprint, which further reduces the complexity of these calculators for users.

The AI-driven emission calculators allow carbon footprint to be calculated for the delivered scenarios:

(4.1) People (Individual and Family)—Any individual or a family, anywhere on earth, can calculate their carbon footprint or greenhouse gas emission footprint.

(4.2) Business—Any business can calculate their carbon footprint, for example carbon footprint of a restaurant or a business in one or more locations, or an IT company, manufacturer, a retailer, a car showroom, a service station, a shop, a grocery store, a barber shop, a yoga studio etc.

(4.3) Product—Any Product such as a automobile, bicycle, book, car, candy, furniture, food, perfume, phone, machine, tire, engine, etc. has an embodied carbon footprint—in other words the carbon emissions generated in production of this product. This footprint can be calculated with AI driven calculators using Life cycle analysis (LCA) and related techniques.

(4.4) Building—Carbon footprint of any building—small, medium or large per square footage, can be calculated, or carbon footprint of hotel room for a night, carbon footprint of hospital, a school, a place of worship, an airport, a railway station etc. can be calculated.

(4.5) Transportation—For example carbon footprint of a car driven from Place A to Place B, or a truck route from Location X to Location Y or an airline trip between two airports. It also includes carbon footprint of a shared or private car, a city bus, a train, a metro/subway, or any other vehicle public or private, a transportation ship, cargo on plane, train or truck, shipping etc.

(4.6) Supply Chain—Products traceability is critical to calculating the emissions from a supply chain. For example, products procured during manufacturing of a product or sending of a parcel from location X to Y or sending of a shipment across continents requires traceability of the goods and services. The Supply chain calculators provide traceability of products and services and the carbon emissions that are generated during the supply chain.

(4.7) Service—For example carbon footprint when delivering accounting services to a business or carbon footprint when delivering pizza to a household or carbon footprint of an electronic transaction, or carbon footprint to cut a lawn are examples of services for which carbon footprint can be calculated.

(5) Fifth, AI/ML Automation Through real time integration with enterprise systems, the present invention eliminates latency. With end-to-end automation the present invention integrates the customer and partner facing front-office with intelligent order processing and inventory management system in the middle-office to fulfilment and global settlement with multiple currencies in the back-office. The system reduces the latency from weeks and days to minutes and seconds.

The back-office intelligence and automation include a Blockchain with a distributed ledger to provide provenance, authentication, security and other controls, and a traditional non-blockchain system to manage general purpose transaction and fulfilment Both working together are referred to as an On-Chain and an Off-Chain server. And Each offset and credit and its batch are digitally watermarked with a unique individual and batch id. An equivalent digital twin of each offset and credit is generated and kept in the inventory. Like any other inventory management system, the inventory of the offset or credit is tracked with a major difference that each offset or credit is has source attributes that are eventually retried through automation from the related blockchain ledger to deliver provenance or traceability of that product. Instant generation of carbon traceability and digital certificates, instant global financial settlement and intelligent Carbon Accounting and Management (I-CAM) with automation and Artificial intelligence that drives the user and partner experience.

(6) Enhances Consumer Engagement: CAP is configurable to enable Businesses to engage their customers in their company's sustainability and NetZero journey. It allows businesses to do the following:

(6.1) Customer Relationship Management: Customers can be informed about the company's sustainability journey.

(6.2) A Customer's EcoStance Page can be published on social media and made available to company's subscribed customers.

(6.3) Customer can buy products from the company by making a choice of making their purchase carbon neutral. This is achieved with an embedded API added to any Point of Sale (POS) system.

The foregoing summary is illustrative only and is not intended to be in any way limiting. In addition to the illustrative embodiments, and features described above, further embodiments, and features will become apparent by reference to the drawings and the following detailed description.

BRIEF DESCRIPTION OF THE DRAWINGS

FIG. 6 depicts a flowchart illustrating an exemplary method of selling and purchasing carbon offsets or digital sustainability products, in accordance with some embodiments of the present disclosure; and FIG. 7 depicts a flowchart illustrating an exemplary method of tracking carbon footprint of a consumer, in accordance with some embodiments of the present disclosure.

Figure 1:
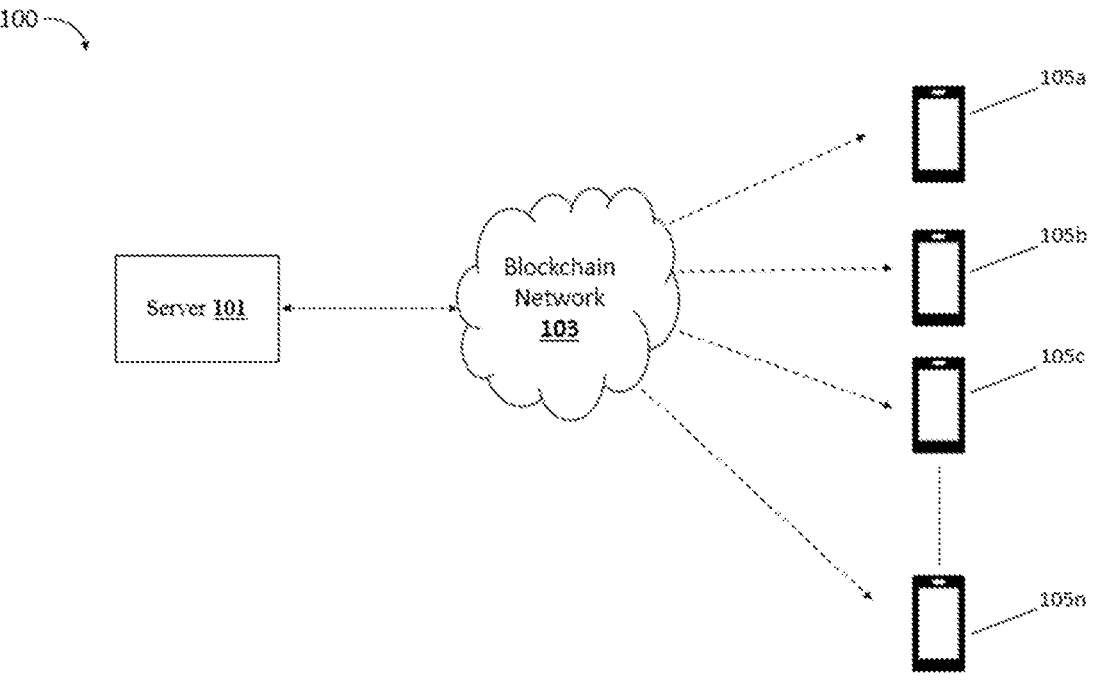
FIG. 1 shows an exemplary environment for neutralizing or reducing carbon footprint, in accordance with some embodiments of the present disclosure.

It should be appreciated by those skilled in the art that any block diagrams herein represent conceptual views of the illustrative systems embodying the principles of the present subject matter. Similarly, it will be appreciated that any flowcharts, flow diagrams, state transition diagrams, pseudo code, and the like represent various processes which may be substantially represented in computer readable medium and executed by a computer or processor, whether such computer or processor is explicitly shown.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiments thereof have been shown by way of example in the drawings and will be described in detail below. It should be understood, however, that these embodiments are not intended to limit the disclosure to the particular form disclosed, but on the contrary, the disclosure is to cover all modifications, equivalents, and alternatives falling within the spirit and the scope of the disclosure.

The terms "comprise(s)", "comprising", "include(s)", or any other variations thereof, are intended to cover a non-exclusive inclusion, such that a setup, device, apparatus, system, or method that comprises a list of components or steps does not include only those components or steps but may include other components or steps not expressly listed or inherent to such setup or device or apparatus or system or method. In other words, one or more elements in a device or system or apparatus proceeded by "comprises . . . a" does not, without more constraints, preclude the existence of other elements or additional elements in the system.

The expressions like "at least one" and "one or more" may be used interchangeably or in combination throughout the description.

In the following detailed description of the embodiments of the disclosure, reference is made to the accompanying drawings that form a part hereof, and in which are shown by way of illustration of specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense. In the following description, well known functions or constructions are not described in detail since they would obscure the description with unnecessary detail.

A blockchain may be used as a distributed public ledger to store information such as digital assets and the like. A blockchain is typically distributed across multiple points of entry (i.e., nodes or peers) and is a consensus of replicated, shared, and synchronized transactions. Cryptography, via hash codes, is used with a blockchain to secure an authentication of a transaction source and removes the need for a central intermediary.

FIG. 1 shows an exemplary environment 100 for neutralizing or reducing carbon footprint, in accordance with some embodiments of the present disclosure.

The environment 100 comprises a server 101, a blockchain network 103, and a plurality of computing device 105*a-n* in communication with each other. In one non-limiting embodiment, the server 101 may be a blockchain server and may comprise a blockchain ledger for storing or maintaining a record of all products and services to be sold over the blockchain network 103. In another non-limiting embodiment, the blockchain network 103 is the internet and the server 101 is the blockchain server. Therefore the computing devices 105*a-n* are connected to the internet and then the blockchain server 101.

The blockchain ledger may be shared with the plurality of computing device 105*a-n* through the blockchain network 103. Each of the plurality of computing device 105*a-n* may have a respective user. The user may be an individual or an organization. The plurality of computing device 105*a-n* may be a smartphone, a computer, a laptop, etc., that may be used for purchase of goods and services online. In an embodiment of the present disclosure, the product and services may be digital or physical products and services. In one non-limiting embodiment, the product and services may be sold as a carbon offset and each product and services may have an associated carbon credit value. The carbon offsets are sold to individuals and organizations over the blockchain network 103 for mitigating the impact of their own carbon footprint.

In one non-limiting embodiment, the carbon offset may comprise renewable energy projects, such as building wind farms that replace coal-fired power plants, energy-efficiency improvements, such as increasing insulation in buildings to reduce heat loss or using more-efficient vehicles for transportation, destruction of potent industrial greenhouse gases such as halocarbons, or carbon sequestration in soils or forests, such as tree-planting activities. However, the carbon offset is not limited to above example and any other product/service that compensates for the emission of carbon dioxide ($CO_2$) or any other greenhouse gases by providing for an emission reduction, is well within the scope of present disclosure.

In an embodiment of the present disclosure, the environment 100 may be used for selling a number of products/services online. The server 101 may maintain a record of each product/service and a respective carbon footprint value associated with the product/service. The server 101 may record all the transaction of the purchase of the products/services that happens over the blockchain network 103 and the server 101 may track a total carbon consumption of each individual who purchased the products/services using the carbon footprint value. In one non-limiting embodiment, the server may issue a digital certificate comprising the carbon footprint at the time of delivery of the products/services.

Thus, the buying and selling of digital or physical products/services over the blockchain network 103 facilitates the users (individual or organization) to keep a track of their total carbon consumption. Further, the maintenance of a record of carbon offsets in a blockchain ledger shared over the blockchain network 103, increases consumer confidence as each transaction is securely recorded, thereby eliminating the chances of double counting and same product/service being sold more than once.

In one embodiment, the present invention 100 could be designed with a simple user interface and back office automation to reach the mass market through a simple web browser-based application that is accessible to anyone with a simple internet web/or a mobile device. It allows buyers to instantly reduce their environment footprint by simply calculating their environmental footprint and buying the offsets and credits as easily as buying shoes online. It provides end to end traceability certificate to reduce the problem of double counting. This embodiment reduces the friction in the marketplace to open a new era of supercharging sustainability for the masses. In one embodiment, the environment 100 allows carbon offsets to be traded in the voluntary markets, based upon supply chain traceability, and elimination of double counting. In one embodiment, the environment 100 allows RECs and SRECs to be on boarded, generated, verified, and then traded with chain of custody, traceability, and elimination of double counting. In one embodiment, the environment 100 allows ERCs and MERCs to be on boarded, generated, verified, and then traded with chain of custody, traceability, and elimination of double counting.

The environment 100 solves the problems existing in the prior arts using the following unique steps such as:

A unique immutable emission instrument digital ID could be assigned for each carbon offset and carbon credit. The emission instrument digital ID could be published and also available to interested parties for verification.

Emission Onboarding and Certification: Some credits such as mobile emission credits go through an onboarding process before they could be converted into a tradable instrument. For instance, a MERC seller may be required to demonstrate the mileage driven by fossil-fuel driven vehicles before they convert their fleet to electric vehicles (EVs). The company may receive emission credits based upon the greenhouse emission saved through the process electrification of the fleet.

Emission Disposition State: extinguishing the instrument when it has reached its end of life so that cannot be double counted through the process of emission disposition state which is also available for verification by interested parties.

Emission Sustainability Certificate (SC) that includes/ Carbon Chain of Custody Certificate (C3 Certificate): A provenance and chain of custody certificate can be created on demand from the ledger that provides the chain of custody for the credit or offset lifecycle. The Emission Chain of Custody Certificate provides traceability from birth-to-disposition of each instrument purchased by the buyer.

Emission/Carbon Guarantee of Authenticity Certificate (CGAC): This certificate guarantees the authenticity and disposition of each offset or credit as the data comes directly from the tamper-proof distributed ledger database.

Emission EcoStance Page or Dashboard: A Page that provides a user or company's (owner) stance on sustainability. Any user 105a-n public internet can access the owner's stance on ecology or environment. It includes both a narrative and a timeline of Sustainability Certificates and proof of traceability with C3 certificates and CGAC guarantee.

Emission Marketplace: A marketplace where sellers and buyers can list their credits and offsets for purchase and final disposition. The authenticity of the instrument is established at the time of listing based upon upstream standards prescribed by independent verification companies and governmental cap and trade mandates. The downstream traceability is managed by the Emission Marketplace with real time generation of Emission Chain of Custody certificate on demand.

Emission Mitigation Node: The lifecycle of the emission credit and offset can be accessed by third parties such as regulators, independent companies, corporates, and those with high stakes, by acquiring a copy of the distributed ledger database as a emission mitigation node. Keeping a copy of the node.

In one embodiment, the environment 100 comprises a private and permissioned Blockchain technology, also known as the Distributed Ledger Technology (DLT), with several distributed ledgers, each identified as a "node" within the system that is powered by a "proof of stake" consensus algorithm. Democratizing the approach to consensus building, enables any interested party including sellers, buyers, regulators, and others to participate as stakeholders in validating the authenticity of the instruments. The data is always encrypted, secure and immutable with built in provenance to ensure a hacker proof system of records. Any tampering with the data on one node, results in an anomaly to be detected and the tampered node is automatically disconnected from the Emission Blockchain network. This approach ensures that each step (i.e. transaction) in the instrument's journey is memorialized in an immutable transaction ledger until its final disposition, in which case the instrument is extinguished and can never be used again eliminating the problem of double counting. Also if an instrument is being used in a transaction before its end of life, it can never be double used as the instrument is considered in play. This level of control and traceability from cradle-to-grave ensures that each offset or credit is used only once with a verifiable disposition at its end of life. The instrument's lifecycle is made available in real time with emission traceability certificate to guarantee lifecycle transparency. For additional security, any third party can procure a copy of the node to verify the data and transaction authenticity.

Figure 2:
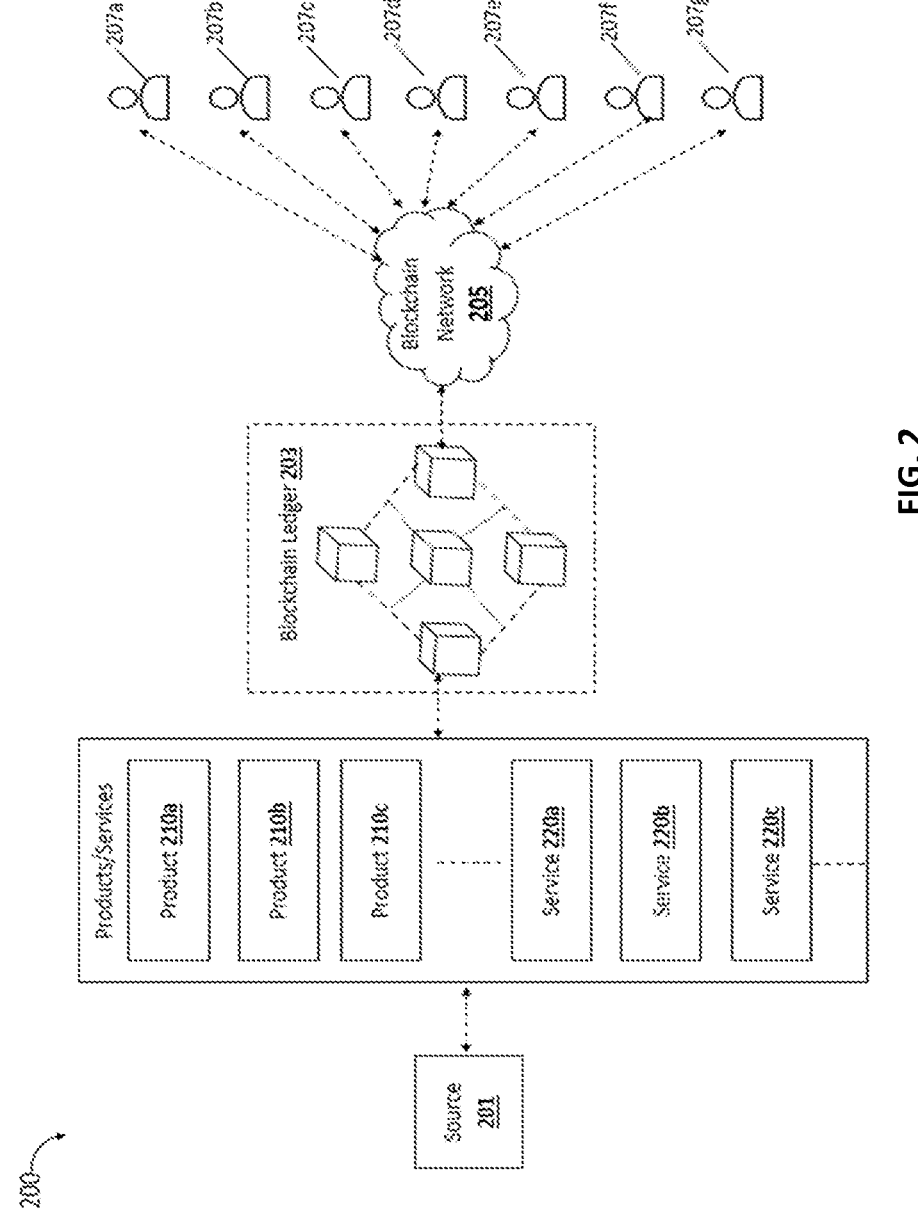
FIG. 2 illustrates an exemplary environment for maintaining a sustainability product/services database using a blockchain network, in accordance with some embodiments of the present disclosure.

FIG. 2 illustrates an exemplary environment 200 for maintaining a sustainability product/services database using a blockchain network, in accordance with some embodiments of the present disclosure.

The environment 200 may comprise at least one source 201, a blockchain ledger 203 maintained at a blockchain server, and a plurality of user 207a-g connected over a blockchain network 203. Then at least one source 201 may introduce products/services available for purchase for the consumer. The products/services may comprise Product 210a, Product 210b, Product 210c, . . . . Service 220a, Service 220b, Service 220c . . . , etc.

In one non-limiting embodiment, the products/services may comprise one or more carbon offset digital products/ services and each of the products/services may have a unique identification code that differentiates the respective product/service from other products/services. Each carbon offset digital product/service may have a respective carbon credit value that may be issued to user in a form of digital certificate, when the carbon offset digital product/service is bought by the user.

In another non-limiting embodiment, the products/services may not be carbon offset digital products/services and may have a respective carbon footprint value. The products/ services may be bought by the user 207a-n online. If the product/service is bought by the user, the blockchain server may issue a digital certificate comprising the carbon footprint value associated with the bought product/service at the time of delivery of the product/service. A track of total carbon footprint or carbon consumption may be maintained by the blockchain server in the blockchain ledger 203.

In an embodiment of the present disclosure, before executing a purchase of the product/service, the plurality of user 207*a-n* may be authenticated using login credentials. The banking details may be provided by the user for completing the transaction. In one non-limiting embodiment, the banking details may be pre-stored in the system and may be fetched at the time of executing a purchase.

In an embodiment of the present disclosure, the blockchain ledger 203 may maintain an inventory of product and services along with its respective metadata. The metadata may comprise one or product/service identification details such as unique identification code, name of product/service, a carbon credit value or carbon footprint value, United National sustainability development goals (SDG) for the product, documentation and supplier details. In one non-limiting embodiment, the metadata may also comprise location or place of origin and a number of available units.

In an embodiment of the present disclosure, the plurality of users 207*a-g* present in the blockchain network 203 may be assigned a unique identifier. If the purchase of the product/service is completed, the unique identifier of the user purchasing the product/service may be encoded using hash function and tagged to blockchain ledger 203 against the respective product/service. The updated blockchain ledger 203 may be shared in the blockchain network 203.

Thus, the buying and selling of digital products/services over the blockchain network 205 facilitates the users (individual or organization) to keep a track of their total carbon consumption and carbon credits. Further, the maintenance of a record of purchase in a blockchain ledger 203 shared over the blockchain network 205, increases consumer confidence as each transaction is securely recorded, thereby eliminating the chances of double counting and same product/service being sold more than once.

Figure 3:
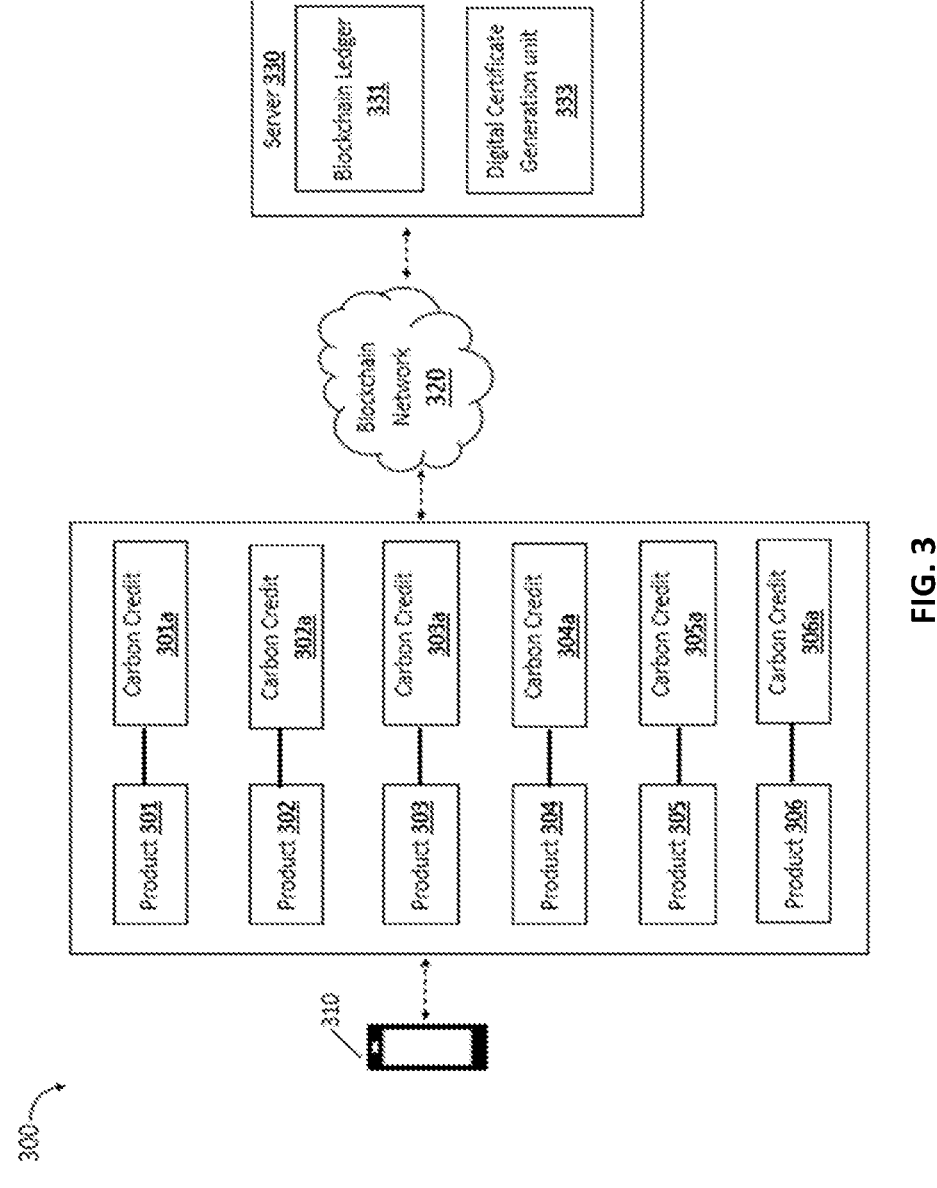
FIG. 3 illustrates an exemplary block diagram for selling and purchasing carbon offsets and digital sustainability products, in accordance with some embodiments of the present disclosure.

FIG. 3 illustrates an exemplary block diagram 300 for selling and purchasing carbon offsets and digital and physical sustainability products, in accordance with some embodiments of the present disclosure.

The block diagram 300 may comprise a computing device 310 and a server 330 in communication with each other through a blockchain network 320. The computing device 310 may be a mobile phone, laptop, computer, etc. The server 330 may be blockchain server and may comprise a blockchain ledger 331 and digital certificate generation unit 333 in communication with each other. The blockchain ledger 331 may be like blockchain ledger 203 as discussed in above embodiments.

In an exemplary embodiment, the blockchain ledger 331 may comprise an inventory of carbon offset products 301, 302, 303, 304, 305, and 306. Each of the product may have a respective carbon credit 301*a*, 302*a*, 303*a*, 304*a*, 305*a*, 306*a*. The inventory may also comprise a respective metadata corresponding to each of the products 301, 302, 303, 304, 305, and 306. The metadata may comprise information as discussed in above embodiments.

The plurality of products 301, 302, 303, 304, 305, and 306 along with their respective carbon credit 301*a*, 302*a*, 303*a*, 304*a*, 305*a*, 306*a* may be presented to a user, via user interface, on the computing device 310 for purchasing the available plurality of products. The user may select one or more of the available products by submitting a request for purchase along with user credentials. The user credentials may comprise a unique identifier of a user and banking details for executing the payment of the purchase. The payment may be executed using one or more techniques known to a person skilled in the art.

The user may be authenticated based on the user credential and a verification of selected product is carried out to determine whether the selected product is already mapped or tagged with another unique identifier of another user. If the selected product is not previously tagged with the unique identifier of another user, the server 330 may confirm the order by tagging the unique identifier of the user/purchaser with the selected product in the blockchain ledger 331.

In one non-limiting embodiment of the present disclosure, the unique identifier of the user/purchaser is encoded using at least one hash function and then tagged to the product by adding a block against the selected product in the blockchain ledger 331. After the tagging is completed, the updated blockchain ledger 331 may be distributed to a plurality of devices connected in the blockchain network 320.

After the execution of the order, the digital certification unit 333 may be configured to issue a digital certificate which comprises of carbon chain of custody traceability certificate and guarantee of authenticity certificate to the purchaser. The digital certificate may comprise a carbon credit value associated with the bought product. In one non-limiting embodiments, the products may be carbon offset digital products, as discussed in above embodiments. In another embodiment the digital certification unit 333 may also create and update a sustainability EcoStance page of the user.

Thus, the maintenance of a record of purchase in the blockchain ledger 333 shared over the blockchain network 320, increases consumer confidence as each transaction is securely recorded, and evidence is provided with blockchain digital certificates and public facing dynamic HTML sustainability page thereby eliminating the chances of double counting and the same product/service being sold more than once. Further, the above-mentioned system facilitates transparency at every stage and decentralization of data.

Figure 4:
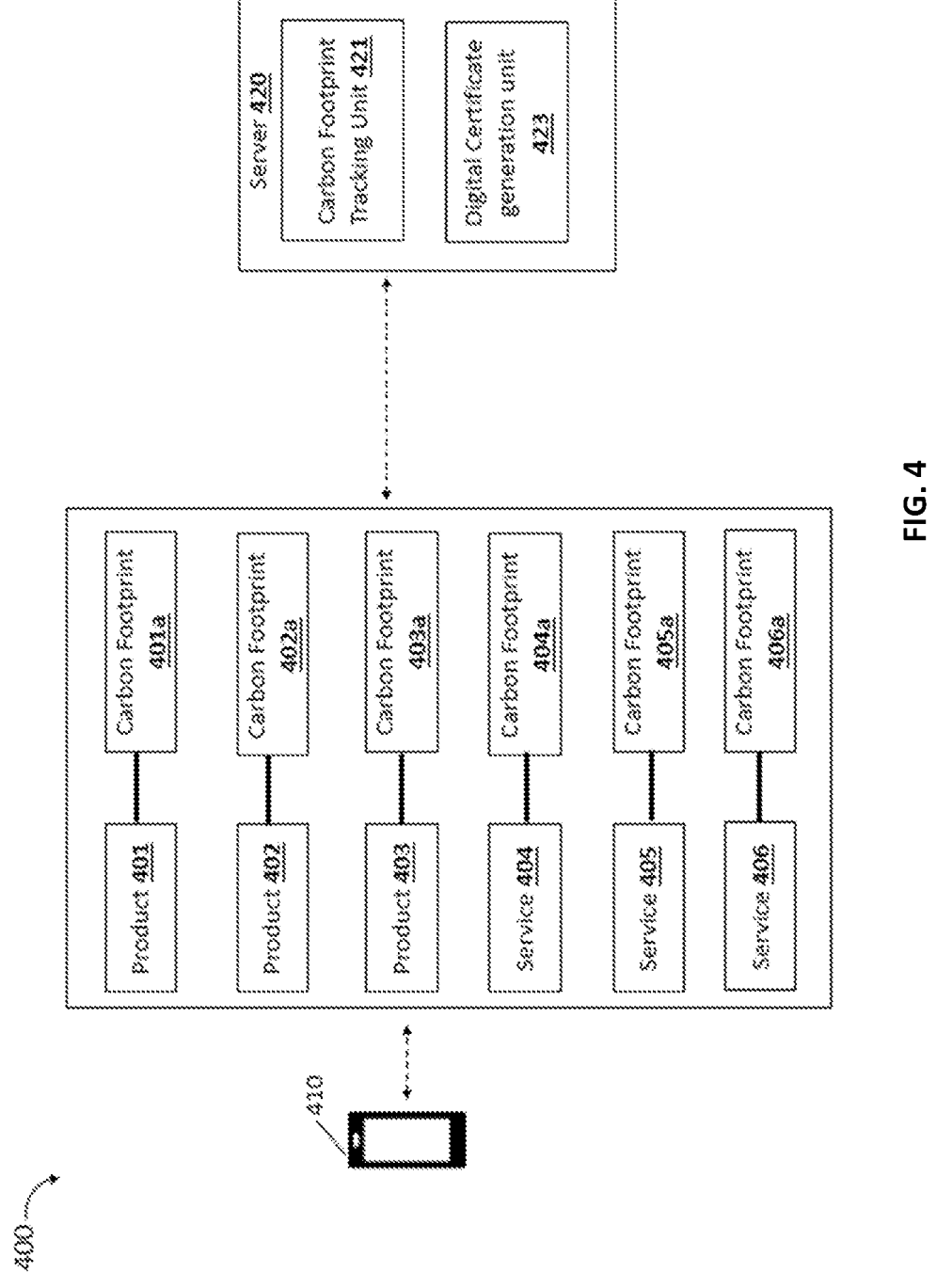
FIG. 4 illustrates an exemplary block diagram for tracking carbon footprint of a consumer, in accordance with some embodiments of the present disclosure.

FIG. 4 illustrates an exemplary block diagram 400 for tracking carbon footprint of a consumer, in accordance with some embodiments of the present disclosure.

The block diagram 400 may comprise a computing device 410 and a server 420 in communication with each other through a blockchain network. The computing device 410 may be a mobile phone, laptop, computer, etc. The server 420 may comprise a carbon footprint tracking unit 421 and digital certificate generation unit 423 in communication with each other. The server 420 may be blockchain server maty comprise a blockchain ledger (not shown).

In an exemplary embodiment, the server 420 may comprise an inventory of products 410, 402, 403, and service 404, 405, 406. Each of the product and service may have a respective carbon footprint 401*a*, 402*a*, 403*a*, 404*a*, 405*a*, 406*a*. The inventory may also comprise a respective metadata corresponding to each of the products and services. The metadata may comprise information as discussed in above embodiments.

The plurality of products and services may be presented to a user, via user interface, on the computing device 410 for purchasing the available plurality of products/services. The user may select one or more of the available products by submitting a request for purchase along with user credentials. The user credentials may comprise a unique identifier of a user and banking details for executing the payment of the purchase. The payment may be executed using one or more techniques known to a person skilled in the art.

The user authentication and product/service verification may be carried out using the procedure as discussed in above embodiments. The order may be then confirmed based on the After the execution of the order, the digital certification unit 423 may be configured to issue a digital certificate to the purchaser. The digital certificate may comprise a carbon footprint value associated with the bought product.

In one non-limiting embodiment of the present disclosure, the carbon footprint tracking unit 421 may be configured to record the carbon footprint value associated with the bought product against respective user identifier in the server 420. The carbon footprint tracking unit 421 may provide the total carbon footprint details to the users or the consumers on their respective devices. In another embodiment the carbon footprint tracking unit 421 may also create and update the sustainability EcoStance page of the user with certificates of all purchases and the total carbon footprint details.

Thus, the tracking of buying and selling of products/ services over the blockchain network facilitates the users (individual or organization) to keep a track of their total carbon consumption. In one non-limiting embodiment of the present disclosure, the carbon footprint tracking unit 421 may provide the total carbon footprint details of each user to regulatory authorities for minimizing or reducing the carbon footprint.

In one non-limiting embodiment, the user may neutralize their respective carbon footprint by purchasing a carbon offset product, as discussed in above embodiments. In another non-limiting embodiment, the server may comprise a recommendation unit for recommending one or more carbon offset products to neutralize the carbon footprint of the bought product.

Figure 5:
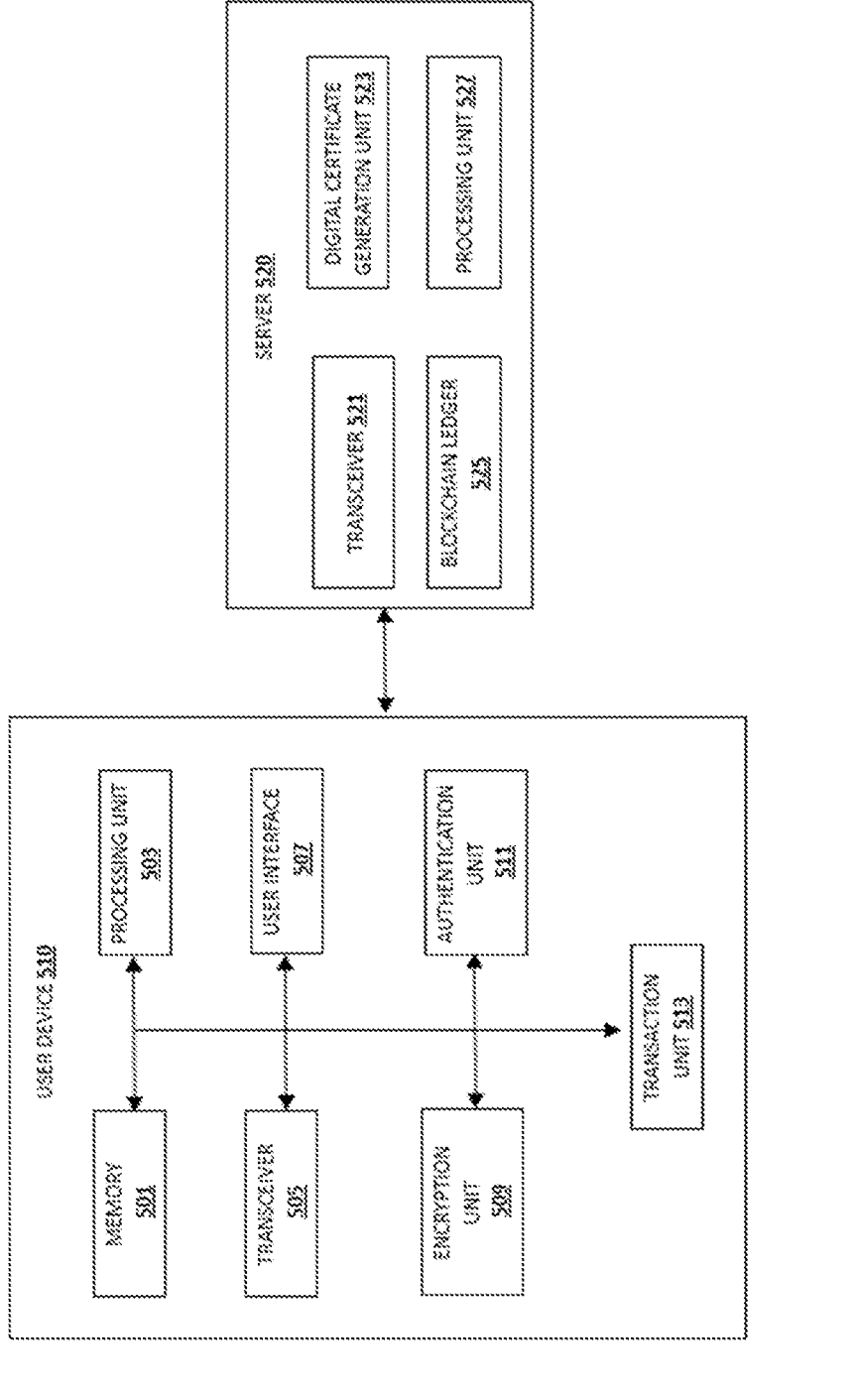
FIG. 5 shows a block diagram of a system for neutralizing or reducing carbon footprint, in accordance with some embodiments of the present disclosure.

FIG. 5 shows a block diagram of a system 500 for neutralizing or reducing carbon footprint, in accordance with some embodiments of the present disclosure.

The system 500 may comprise user device 510 and server 510 connected over a blockchain network. The user device 510 may be a mobile phone, laptop, computer, etc. The server 520 may be blockchain server. The user device may comprise a memory 501, a processing unit 503, a transceiver 505, a user interface 507, an encryption unit 509, an authentication unit 511, and a transaction unit 513 in communication with each other. 310 and a server 330 in communication with each other through a blockchain network 320.

The server 520 may be blockchain server. The server 520 may comprise a transceiver 521, a digital certificate generation unit 523, a blockchain ledger 525 and a processing unit 527 in communication with each other. The blockchain ledger 525 may be configured to perform one or more functionalities similar to that of blockchain ledger 203 as discussed in above embodiments.

The memory 501 may be configured to store a plurality of instructions to be executed by the processing unit 503 for performing various functionalities of the user device. The transceiver 505 may be configured to receive a plurality of carbon offset products available for purchase from one or more sources. The one or more sources may be authorized by the regulatory authorities to sell the carbon offset products.

The processing unit 503 may be configured to maintain an inventory of the plurality of carbon offset products. Each carbon offset product may be stored along with a respective metadata in the blockchain ledger 525 of the server 520 and may be distributed to a number of devices over the blockchain network. The metadata is encrypted using at least one hash function and mapped to the corresponding carbon offset product in the blockchain ledger 525.

In one non-limiting embodiment, the metadata may comprise one or product/service identification details such as unique identification code, name of product/service, price, description, sustainability development goals, a carbon credit value or carbon footprint value, and supplier details. In one non-limiting embodiment, the metadata may also comprise location or place of origin and a number of available units.

The processing unit 503 may be configured to display, via a user interface, the plurality of carbon offset products along with a respective carbon credit value to the user on the user device 510. The user may select one or more carbon offset products through the user interface and submit a request for purchase along user credentials. The processing unit 503 may be configured to receive, via the user interface, the request for purchase from the user, the request comprising at least one carbon offset product selected by the user and the user credentials for authenticating the purchase. The user credentials may comprise a user identifier, a password, bank account details for executing a transaction. The payment may be executed by the transaction unit 511 using one or more techniques known to a person skilled in the art.

In an embodiment of the present disclosure, the processing unit 503 may authenticate the purchase by comparing the user identifier and the password with the plurality of users' details present in the database and processing the order of purchase if the user identifier and the password match with at least one user of the plurality of users.

The processing unit 503 may be configured to verify the selected at least one carbon offset product provenance by validation of the metadata mapped with the at least one carbon offset product in the blockchain ledger 525. To verify the selected at least one carbon offset product provenance, the processing unit may be configured to extract the metadata mapped with the selected at least one carbon offset product from the server 520, determine whether the selected at least one carbon offset product was previously tagged with a unique identifier of another user, as discussed in above embodiments. The processing unit 503 may be configured to validate the selected at least one carbon offset product provenance if the selected at least one carbon offset product was not previously tagged with a unique identifier of another user.

The processing unit 503 may be configured to confirm an order of purchase of the selected at least one carbon offset product if the at least one carbon offset product provenance is validated. The processing unit 503 is configured to generate a unique identifier tag based on the user credentials, encrypt, using the encryption unit 509, the unique identifier tag by means of the at least one hash function to generate a blockchain block, and update the blockchain ledger 525 by adding the blockchain block to the selected at least one carbon offset product. In one non-limiting embodiment, the encrypted unique identifier tag is transmitted to the server 520 and the blockchain ledger 525 may be updated by the processing unit 527 of the server 520.

Once the order is confirmed, the processing unit 503 may be configured to generate a digital certificate based on the confirmed order. The digital certificate may comprise the carbon credit value associated with the purchased at least one carbon offset product. The digital certificate includes carbon traceability with carbon chain of custody certificate (C3 Certificate) and Carbon guarantee of authenticity (CGAC) certificate. Additionally an dynamic HTML EcoStance page for a user is created or updated. This digital certification facilitates the user to keep a track of carbon credits available to the user. In one non-limiting embodiment, the digital certificate may be generated by the digital certificate generation unit 523 and may be forwarded to the user device 510. The generated digital certificate may be stored in the blockchain ledger 525 at the server and made available to owner-user and other users on the user device 510 on the user interface 507.

Further the maintenance of a record of purchase in the blockchain ledger 525 shared over the blockchain network, increases consumer confidence as each transaction is securely recorded, thereby eliminating the chances of double counting and same product/service being sold more than once. Furthermore, the above-mentioned system 500 facilitates transparency at every stage and decentralization of data.

In an embodiment of the present disclosure, the processing unit 503 may be configured to display, via the user interface, a plurality of product and services along with their respective carbon footprint for purchase. The user may select at least one product/service and submits a purchase request to the user device 510. The processing unit 503 may be configured to receive a selection of at least one product/service along with credentials of a user for authenticating the purchase, confirm an order if the received credentials of the user are authenticated. The authentication of the user may be carried out using the procedures as discussed in above embodiment.

The processing unit 503 may be configured to deliver the selected at least one product/service along with a digital certificate. The digital certificate may comprise a value of carbon footprint mapped with the delivered at least one product/service. The digital certificate may be generated by the digital certificate generation unit 523 and may be forwarded to the user device 510. The generated digital certificate may be stored in the blockchain ledger 525 at the server.

In one non-limiting embodiment of the present disclosure, the processing unit 527 may comprise a carbon footprint tracking unit to record the carbon footprint value associated with the bought product/services against respective user identifier at the server 520. The carbon footprint tracking unit may provide the total carbon footprint details to the users or the consumers on their respective devices.

Thus, the tracking of buying and selling of products/services over the blockchain network facilitates both the system and the users (individual or organization) to keep a track of their total carbon consumption. In one non-limiting embodiment of the present disclosure, the carbon footprint tracking unit may provide the total carbon footprint details of each user to regulatory authorities for minimizing or reducing the carbon footprint.

In one non-limiting embodiment, the user may neutralize their respective carbon footprint by purchasing a carbon offset product, as discussed in above embodiments. In another non-limiting embodiment, the server 520 may comprise a recommendation unit for recommending one or more carbon offset products to neutralize the carbon footprint of the bought product.

FIG. 6 depicts a flowchart illustrating an exemplary method of selling and purchasing carbon offsets or digital sustainability products, in accordance with some embodiments of the present disclosure.

At block 601, a plurality of carbon offset products available for purchase are received from at least one source. The at least one source may be authorized by the regulatory authorities to sell the carbon offset products. The carbon offsets may be received through file, through machine to machine communication or directly submitted into the system.

At block 603, an inventory of the plurality of carbon offset products is maintained at a server. Each carbon offset product may be stored along with a respective metadata in the blockchain ledger of the server and may be distributed to several devices over the blockchain network. The metadata is encrypted using at least one hash function and mapped to the corresponding carbon offset product in the blockchain ledger.

In one non-limiting embodiment, the offset product may be partly stored on the blockchain ledger and partly off the blockchain ledger to optimize processing of the data for speed and efficiency.

In one non-limiting embodiment, the metadata may comprise one or product/service identification details such as unique identification code, name of product/service, sustainability development goals, description, a carbon credit value or carbon footprint value, and supplier details. In one non-limiting embodiment, the metadata may also comprise location or place of origin and several available units.

At block 605, the plurality of carbon offset products may be displayed along with a respective carbon credit value to the user on a user interface of the user device. The user may select one or more carbon offset products through the user interface and submit a request for purchase along user credentials. At block 607, a request for purchase is received from the user, the request comprising at least one carbon offset product selected by the user and the user credentials for authenticating the purchase. The user credentials may comprise a user identifier, a password, bank account details for executing a transaction. The payment may be executed using one or more techniques known to a person skilled in the art.

In an embodiment of the present disclosure, at block 605, the plurality of carbon credits, mobile emission credits and other offset and credits may be displayed along with their respective carbon credit value and other details.

In yet another embodiment of the present disclosure, at block 605, the plurality of other sustainable digital or physical products may be displayed along with their respective carbon credit value and other details.

In an embodiment of the present disclosure, a purchase of at least one carbon offset may be authenticated by comparing the user identifier and the password with the plurality of users details present in the database and processing the order of purchase if the user identifier and the password match with at least one user of the plurality of users.

Further, at block 607, the selected at least one carbon offset product provenance may be verified by validating the metadata mapped with the at least one carbon offset product in the blockchain ledger. To verify the selected at least one carbon offset product provenance, the method 600 may comprise extracting the metadata mapped with the selected at least one carbon offset product from the server, determining whether the selected at least one carbon offset product was previously tagged with a unique identifier of another user, and validating the selected at least one carbon offset product provenance if the selected at least one carbon offset product was not previously tagged with a unique identifier of another user. The verification and \validation may be carried out using the procedures as discussed in above embodiments.

At block 609, an order of purchase of the selected at least one carbon offset product is confirmed if the at least one carbon offset product provenance is validated. The confirmation of the order may comprise generating a unique identifier tag based on the user credentials, encrypting the unique identifier tag by means of the at least one hash function to generate a blockchain block, and updating the blockchain ledger by adding the blockchain block to the selected at least one carbon offset product. In one non-limiting embodiment, the encrypted unique identifier tag is transmitted to the server and the blockchain ledger may be updated by the server.

Once the order is confirmed, at block 611, a digital certificate may be generated based on the confirmed order. The digital certificate may comprise the sustainability certificate with carbon credit value associated with the purchased at least one carbon offset product, the carbon chain of custody certificate (C2 certificate), the guarantee of authenticity certificate (CGAC) and an EcoStance page for the user or company is created or updated. This digital certification facilitates the system and the user to keep a track of carbon credits available with the user. In one non-limiting embodiment, the digital certificate may be generated by the server and may be forwarded to the user device. The generated digital certificate may be stored entirely in the blockchain ledger at the server or it is stored partly on the blockchain server and partly off-chain with only the metadata of the certificate stored in the blockchain while the certificate itself may be stored off-chain.

Thus, the maintenance of a record of all purchases and related transactions is maintained in the blockchain ledger and shared over the blockchain network, which increases consumer confidence as each transaction is securely recorded, thereby eliminating the chances of double counting and same product/service being sold more than once. Furthermore, the method 600 facilitates transparency at every stage and decentralization of data.

In another non-limiting embodiment of the present disclosure, the steps of method 600 may be performed in an order different from the order described above.

FIG. 7 depicts a flowchart illustrating an exemplary method of tracking carbon footprint of a consumer, in accordance with some embodiments of the present disclosure.

At block 701, a plurality of product and services along with their respective carbon footprint is displayed on a user interface of a user device for purchase. The user may select at least one product/service and submits a purchase request to the user device. At block 703, a selection of at least one product/service along with credentials of a user is received by the user device. The user credentials may be used to authenticate the user and completing the transaction, as discussed in above embodiments.

At block 705, an order is confirmed if the received credentials of the user are authenticated. The authentication of the user may be carried out using the procedures as discussed in above embodiment.

At block 707, the selected at least one product/service along with a digital certificate is delivered to the user. The digital certificate may comprise a value of carbon footprint mapped with the delivered at least one product/service. The digital certificate may be generated by the server and may be forwarded to the user device. The generated digital certificate may be stored in the blockchain ledger at the server.

In one non-limiting embodiment of the present disclosure, the method 700 further comprises calculating a total value of carbon footprint based on the purchased product and services for the user and maintaining a record of the total carbon footprint value consumed by the user at a server.

The server may comprise a carbon footprint tracking unit to record the carbon footprint value associated with the bought product/services against respective user identifier at the server. The carbon footprint tracking unit may provide the total carbon footprint details to the users or the consumers on their respective devices.

Thus, the tracking of buying and selling of products/services over the blockchain network facilitates the users (individual or organization) to keep a track of their total carbon consumption. In one non-limiting embodiment of the present disclosure, the carbon footprint tracking unit may provide the total carbon footprint details of each user to regulatory authorities for minimizing or reducing the carbon footprint.

In one non-limiting embodiment, the user may neutralize their respective carbon footprint by purchasing a carbon offset product, as discussed in above embodiments. In another non-limiting embodiment, the method 700 may further comprise recommending one or more carbon offset products to neutralize the carbon footprint of the bought product.

In another non-limiting embodiment of the present disclosure, the steps of method 700 may be performed in an order different from the order described above.

The present invention may provide a method that includes one or more of storing a plurality of transactions in a carbon offset blockchain, where each stored transaction may include one or more items included in the transaction and a carbon footprint associated with the one or more items included in the transaction.

The present invention may include a Carbon Footprint Tracking Unit 421 configured to track the carbon offset, carbon credit, mobile credit or any such carbon offset transaction with traceability from source (where it was born or originated) to disposition.

The present invention may include a Digital Certificate Generation Unit 423 configured to generate (1) Sustainability Certificate that includes (1a) one or more Carbon Chain of Custody Certificates (C3 Certificate) based upon the products a user buys: which is a customer facing certificate that is created in real time to provide the carbon offset traceability from the source to disposition; and (2) a Carbon Guarantee of Authenticity Certificate (CGAC): a customer facing document that is produced in real time. It is a Certificate that guarantees with metadata the authenticity of carbon traceability as shown on that the C3 certificates. It authenticates that the C3 certificate is authentic. It uses a hash function to verify authenticity of any document. First, when a document is created or registered, it creates a hash of the document. Then when the document is accessed, it calculates the hash of the accessed document. If the hash is same, the document is authenticated, otherwise it is not as it may have been tampered with and its content have changed.

The present invention may include a platform that enables end users to purchase carbon offsets and other sustainable digital or physical products in an easy and familiar way that today's online consumers are used to.

The present invention may include APIs that can be embedded at the point-of-sale (POS) systems. In an online POS or physical POS the API enables end-customers to decide with a click of a checkbox if they want to make their purchase carbon neutral. If they want to make their purchase carbon neutral, then the API makes a reverse/reply API call to purchase the appropriate carbon offsets to make the customer's purchase carbon neutral. This approach empowers individuals to make their own informed decision if they want to make their purchase carbon neutral.

The present invention may include browser plugins that can be added by consumers to make every purchase carbon neutral. This plugin is at the browser level and not at the point-of-sale, giving another approach to reducing one's carbon footprint.

The present invention may include a "EcoStance" Profile Page allowing each individual and business user to automatically publish their stance or position of ecofriendly practices and sustainability. The software provides a ready-made page that can be easily customized. It includes a QR code that can be embedded in one's resume, social media or a company's website.

The present invention may include an artificial-intelligence-driven algorithms that simplify Calculations for individuals and businesses to calculate their carbon footprint.

Traceability is managed by the Carbon Footprint Tracking Unit 421. The Carbon Footprint Tracking Unit 421 first associates each carbon offset with a unique digital identification (UDI). This UDI is then used to track each carbon offset. The traceability of each asset is stored in blockchain to ensure that its provenance is unalterable. When a user buys a carbon offset, digital sustainability certificate, by way of the Digital Certificate Generation Unit 423, is created from the current state of carbon offset. In step 2, supply chain traceability flow is created that is put on the "Sustainability Certificate" that includes the Carbon Chain of Custody Certificate (C3 certificate) for user to see. In step 3, the Carbon Chain of Authenticity Certificate (CGAC) is created by comparing the hash of the Sustainability Certificate with the hash of the certificate when it was accessed. If the two are the same, then the "Sustainability Certificate" is authenticated and the traceability information under the "Carbon Chain of Custody" section is authentic as well.

In the second area of reducing friction, a systemic platform provides the front to end customer to purchase carbon offsets. These offsets when purchased result in "Sustainability Certificate" with carbon traceability under "Carbon Chain of Custody" section to be produced. Additionally, the GCAC is produced that authenticates the sustainability certificate.

After that, the user gets a "Eco Stance" Page that is an HTML page with a QR Code that the customer can edit. The basic page comes with some default information, that the end customer can edit to personalize their eco stance. This is like a linked in page or one's resume. The EcoStance page may be updated with user's additional purchases, every time a user makes a purchase. This page is also equivalent to a Sustainability dashboard that a business can publish or link on their web site to publish one's stance on ecofriendly practices, NetZero and sustainability. This page is also used to promote one's stance on becoming a carbon neutral company. The content on this page conforms to sustainability and NetZero standards.

Finally, AI Calculator makes it easy for end users and small to medium businesses to calculate their carbon footprint. Use of AI simplifies the calculations by making it simple for end users to input the data. Rather than hundreds or dozens of fields of input, the simplified calculator requires only a handful of fields.

A blockchain software provides the underlying storage and provenance for traceability. A smart contract enables document access, document registration and traceability. An off-chain system provides the capability to register assets, users and buying function. A bridge between the blockchain (on chain) and off-chain system provides the integration between on chain and off chain capabilities. The bridge, also known as a Blockchain oracle, provides the capability to ensure that only a small snippet or metadata is stored on the blockchain with reference to data on the off chain for speed, security and efficiency.

The systemic platform may reside on the off-chain platform to manage all accounting and fulfilment. The on-chain capability ensures that performance of the online system is not impacted. The blockchain is used for traceability with provenance, document authentication, assigning unique identity, disposition of asset and security.

Any end user can use the present invention by going to the company's systematic platform and making a purchase. Additionally, any business user, software developer or a web developer can embed the API in their point of sale to enable their end users to make their purchase carbon neutral.

Additionally, the present invention can be used in tracking packages and documents in the logistics industry. It can be used in food ingredient traceability in the food and restaurant industry. It can be used in content authenticity for any document in any industry to authenticate the authenticity of any document that is digitized. It can be used in traceability of real estate property.

Also, the present invention can create a product to manage sustainability for individuals and companies. The present invention can be embodied in a device to measure the carbon footprint of individuals and companies. A product or device to measure traceability of any asset.

In certain embodiments, the network may refer to any interconnecting system capable of transmitting audio, video, signals, data, messages, or any combination of the preceding. The network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

The server and the computer of the present invention may each include computing systems. This disclosure contemplates any suitable number of computing systems. This disclosure contemplates the computing system taking any suitable physical form. As example and not by way of limitation, the computing system may be a virtual machine (VM), an embedded computing system, a system-on-chip (SOC), a single-board computing system (SBC) (e.g., a computer-on-module (COM) or system-on-module (SOM)), a desktop computing system, a laptop or notebook computing system, a smart phone, an interactive kiosk, a mainframe, a mesh of computing systems, a server, an application server, or a combination of two or more of these. Where appropriate, the computing systems may include one or more computing systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing systems may perform at different times or at different locations one or more steps of one or more methods described or illustrated herein, where appropriate.

In some embodiments, the computing systems may execute any suitable operating system such as IBM's zSeries/Operating System (z/OS), MS-DOS, PC-DOS, Mac- OS, Windows, Unix, OpenVMS, an operating system based on Linux, or any other appropriate operating system, including future operating systems. In some embodiments, the computing systems may be a web server running web server applications such as Apache, Microsoft's Internet Information Server™, and the like. In some embodiments the computing system may be a hosted environment in one or more clouds such as Azure Cloud, Google Cloud, Amazon AWS, and the like.

In particular embodiments, the computing systems include a processor, a memory, a user interface and a communication interface. In particular embodiments, the processor includes hardware for executing instructions, such as those making up a computer program. The memory includes main memory for storing instructions such as computer program(s) for the processor to execute, or data for processor to operate on. The memory may include mass storage for data and instructions such as the computer program. As an example, and not by way of limitation, the memory may include an HDD, a floppy disk drive, flash memory, an optical disc, a magneto-optical disc, magnetic tape, a Universal Serial Bus (USB) drive, a solid-state drive (SSD), or a combination of two or more of these. The memory may include removable or non-removable (or fixed) media, where appropriate. The memory may be internal or external to computing system, where appropriate. In particular embodiments, the memory is non-volatile, solid-state memory.

The user interface may include hardware, software, or both providing one or more interfaces for communication between a person and the computer systems. As an example, and not by way of limitation, a user interface device may include a keyboard, keypad, microphone, touch-screen monitor, mouse, printer, scanner, speaker/voice, still camera, stylus, tablet, touchscreen, trackball, video camera, another suitable user interface or a combination of two or more of these. A user interface may include one or more sensors. This disclosure contemplates any suitable user interface.

The communication interface includes hardware, software, or both providing one or more interfaces for communication (e.g., packet-based communication) between the computing systems over the network. As an example, and not by way of limitation, the communication interface may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface. As an example, and not by way of limitation, the computing systems may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computing systems may communicate with a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these. The computing systems may include any suitable communication interface for any of these networks, where appropriate.

It is to be understood that not necessarily all objectives or advantages may be achieved in accordance with any particular embodiment described herein. Thus, for example, those skilled in the art will appreciate that certain embodiments may be configured to operate in a manner that achieves or optimizes one advantage or group of advantages as taught herein without necessarily achieving other objects or advantages as may be taught or suggested herein.

In a non-limiting embodiment of the present disclosure, one or more non-transitory computer-readable media may be utilized for implementing the embodiments consistent with the present disclosure. A computer-readable media refers to any type of physical memory (such as the memory) on which information or data readable by a processor may be stored. Thus, a computer-readable media may store one or more instructions for execution by the at least one processor, including instructions for causing the at least one processor to perform steps or stages consistent with the embodiments described herein. The term "computer-readable media" should be understood to include tangible items and exclude carrier waves and transient signals. By way of example, and not limitation, such computer-readable media can comprise Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Thus, certain aspects may comprise a computer program product for performing the operations presented herein. For example, such a computer program product may comprise a computer readable media having instructions stored (and/or encoded) thereon, the instructions being executable by one or more processors to perform the operations described herein. For certain aspects, the computer program product may include packaging material.

The terms "an embodiment", "embodiment", "embodiments", "the embodiment", "the embodiments", "one or more embodiments", "some embodiments", and "one embodiment", "other embodiment", "yet another embodiment", "non-limiting embodiment" mean "one or more (but not all) embodiments of the disclosure(s)" unless expressly specified otherwise.

The various exemplary logical blocks and modules described in connection with the embodiments disclosed herein can be implemented or executed by a machine such as a processor. The processor may be a microprocessor, but alternatively, the processor may be a controller, a microcontroller, or a state machine, or a combination thereof. The processor can include an electrical circuit configured to process computer executable instructions. In another embodiment, the processor includes an application specific integrated circuit (ASIC), a field programmable gate array (FPGA), or other programmable device that performs logical operations without processing computer executable instructions. The processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, the processor may also include primarily analog components. For example, some or all of the signal processing algorithms described herein may be implemented by analog circuitry or mixed analog and digital circuitry. A computing environment may include any type of computer system, including, but not limited to, a computer system that is based on a microprocessor, mainframe computer, a digital signal processor, a portable computing device, a device controller, or a computing engine within the device.

The terms "including", "comprising", "having" and variations thereof mean "including but not limited to", unless expressly specified otherwise.

The enumerated listing of items does not imply that any or all of the items are mutually exclusive, unless expressly specified otherwise.

A description of an embodiment with several components in communication with each other does not imply that all such components are required. On the contrary, a variety of optional components are described to illustrate the wide variety of possible embodiments of the disclosed methods and systems.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the embodiments of the present disclosure are intended to be illustrative, but not limiting, of the scope of the disclosure, which is set forth in the appended claims. It should be understood, of course, that the foregoing relates to exemplary embodiments of the invention and that modifications may be made without departing from the spirit and scope of the invention as set forth in the following claims.

What is claimed is:

1. A system, comprising:
a memory for storing a plurality of instructions;
a processing unit in communication with the memory capable of executing the plurality of instructions; and
a transceiver in communication with the memory and the processing unit, and the transceiver is configured to receive a plurality of carbon offset products available for purchase,
wherein the processing unit is configured to:
maintain an inventory of the plurality of carbon offset and related offset and credit products, wherein each of the plurality of carbon offset and credit products are stored along with a respective metadata in a blockchain ledger, and wherein each metadata is encrypted using at least one hash function and mapped to a corresponding carbon offset product;
display, via a user interface, the plurality of carbon offset and credit products along with a respective carbon credit value to a user on a mobile device;
receive, via the user interface, a request for purchase from the user, wherein the request comprises at least one carbon offset product selected by the user and user credentials for authenticating the purchase;
receive via API call from a pre-authorized machine to purchase on behalf of a user or a company; wherein the request comprises at least one carbon offset or credit product selected along with machine and user credentials for authenticating the purchase;
verify the selected at least one carbon offset or credit product provenance by validation of the metadata mapped with the at least one carbon offset product in the blockchain ledger;
confirm an order of purchase of the selected at least one carbon offset or credit product if the at least one carbon offset or credit product provenance is validated,
wherein to confirm the order, the processing unit is configured to:
generate a unique identifier tag based on the user credentials;

encrypt the unique identifier tag using the at least one hash function to generate a blockchain block; and
update the blockchain ledger by adding the blockchain block to the selected at least one carbon offset product;
generate a digital certificate comprising of carbon chain of custody certificate that provides carbon traceability and carbon guarantee of authenticity certificate to verify the authenticity of digital certificate, based on the confirmed order, wherein the digital certificate comprises of the carbon credit value associated with the purchased at least one carbon offset product; and
generate a EcoStance dynamic HTML sustainability page on the confirmed order, wherein the sustainability page comprises of digital certificates of purchases associated with the purchase of at least one carbon offset product.

2. The system of claim 1, wherein the blockchain ledger is maintained at a server and shared with a plurality of users and server machines over a blockchain network and the Internet to enable any user or machine with an Internet connection to purchase products from user devices and machines with Application Programming Interface (API).

3. The system of claim 1, wherein the user credentials comprise a user identifier, a password, bank account details for executing a transaction and for API transaction, additional credentials comprise of a public private keys.

4. The system of claim 3, wherein to authenticate the purchase, the processing unit is configured to:
compare the user identifier and the password with a plurality of user details present in a database;
compare the security keys for API with a plurality of machine details present in the database; and
process the order of purchase if the user identifier and the password or machine security keys match with at least one user of the plurality of users or one machine of the plurality of machines.

5. The system of claim 1, wherein the metadata comprises one or more of: product identification details, a carbon credit value, and supplier details, sustainability development goals, product documentation and wherein the product identification details comprise type of carbon offset and credit product, location or place of origin and a number of available units.

6. The system of claim 1, wherein to update the blockchain ledger, the processing unit is configured to:
update a plurality of available units of the selected at least one carbon offset product remaining after executing a transaction of the selected at least one carbon offset product.

7. The system of claim 1, wherein the processing unit is configured to:
maintain a count of carbon offsets and credits associated with a purchased carbon offset product for the user.

8. The system of claim 1, wherein to verify the selected at least one carbon offset product provenance, the processing unit is configured to:
extract the metadata mapped with the selected at least one carbon offset product;
determine whether the selected at least one carbon offset product was previously tagged with a unique identifier of another user; and
validate the selected at least one carbon offset product provenance if the selected at least one carbon offset product was not previously tagged with a unique identifier of another user.

* * * * *